(12) United States Patent
Jennewein et al.

(10) Patent No.: US 12,540,155 B2
(45) Date of Patent: Feb. 3, 2026

(54) PROCESS FOR THE PURIFICATION OF LACTO-N-NEOTETRAOSE

(71) Applicant: Chr. Hansen A/S, Hoersholm (DK)

(72) Inventors: Stefan Jennewein, Bad Honnef (DE); Markus Helfrich, Bad Hoenningen (DE)

(73) Assignee: Chr. Hansen A/S, Hoersholm (DK)

( * ) Notice: Subject to any disclaimer, the term of this patent is extended or adjusted under 35 U.S.C. 154(b) by 838 days.

(21) Appl. No.: 17/618,243

(22) PCT Filed: Jun. 10, 2020

(86) PCT No.: PCT/EP2020/066018
§ 371 (c)(1),
(2) Date: Dec. 10, 2021

(87) PCT Pub. No.: WO2020/249584
PCT Pub. Date: Dec. 17, 2020

(65) Prior Publication Data

US 2022/0251131 A1    Aug. 11, 2022

(30) Foreign Application Priority Data

Jun. 14, 2019 (EP) .................................. 19180396

(51) Int. Cl.
| | |
|---|---|
| *C07H 5/04* | (2006.01) |
| *B01D 9/00* | (2006.01) |
| *B01D 15/18* | (2006.01) |
| *B01D 15/36* | (2006.01) |
| *B01D 15/42* | (2006.01) |
| *B01D 61/02* | (2006.01) |
| *B01D 69/02* | (2006.01) |
| *C07H 1/08* | (2006.01) |

(52) U.S. Cl.
CPC ............. *C07H 5/04* (2013.01); *B01D 9/0004* (2013.01); *B01D 9/0045* (2013.01); *B01D 15/1828* (2013.01); *B01D 15/185* (2013.01); *B01D 15/1864* (2013.01); *B01D 15/362* (2013.01); *B01D 15/426* (2013.01); *B01D 61/027* (2013.01); *B01D 69/02* (2013.01); *C07H 1/08* (2013.01); *B01D 2325/34* (2013.01)

(58) Field of Classification Search
CPC .......... C07H 1/08; C07H 3/06; B01D 61/027; B01D 15/1864
See application file for complete search history.

(56) References Cited

U.S. PATENT DOCUMENTS

| | | | |
|---|---|---|---|
| 9,815,862 B2 * | 11/2017 | Podányi .................. | A23L 33/10 |
| 10,435,427 B2 | 10/2019 | Jennewein et al. | |
| 11,168,105 B2 | 11/2021 | Jennewein et al. | |
| 2015/0329580 A1 | 11/2015 | Podányi et al. | |
| 2016/0237104 A1* | 8/2016 | Jennewein ........... | A61K 31/702 |

FOREIGN PATENT DOCUMENTS

| | | |
|---|---|---|
| EP | 3494805 A1 | 6/2019 |
| RU | 2682445 C2 | 3/2019 |
| WO | 2011100980 A1 | 8/2011 |
| WO | 2014086373 A1 | 6/2014 |
| WO | 2015049331 A1 | 4/2015 |
| WO | 2015106943 A1 | 7/2015 |
| WO | 2019003133 A1 | 1/2019 |
| WO | 2019110804 A | 6/2019 |

OTHER PUBLICATIONS

Grandison, Songklanakarin J. Sci. Technol. 2002, 24(Suppl.): 915-28. (Year: 2002).*
Kuhn et al, "Fucosido-lactose, das Trisaccharid der Frauenmilch," Chemische Berichte, 1955, 88(8):1135-1146. (Kuhn et al., "Fucosido-lactose, the trisaccharide of human milk," Chem. Ber., 1955, 88(8):1135-1146.).
Kuhn et al, "Kristallisation und Konstitutionsermittlung der Lacto-N-fucopentaose I," Chemische Berichte, 1956, 89 (11):2514-2523. (Kuhn et al, "Determination of Crystallisation and Constitution of Lacto-N-fucopentaose," Chem. Ber., 1956, 89(11):2514-2523.).
Kuhn et al, "Regarding a tetrasaccharide from human milk containing nitrogen," Chem. Ber., 1953, 86(6):827-830.
Kuhn et al, "The constitution of lacto-N-neotetraose," Chem. Ber., 1962, 95(11):518-522.
Kuhn et al, "Uber die Lacto-N-tetraose und ihre Beziehungen zu den fucose-haltigen Oligosacchariden der Frauenmilch," Chemische Berichte, 1954, 87(3):289-300. (Kuhn et al., "Regarding lacto-N-tetraose and its relationship to the fucosylated oligosaccharides in human milk," Chem. Ber., 1954, 87(3):289-300.).
Kuhn et al., "Die Konstitution der Lacto-N-tetraose," Chemische Berichte, 1956, 89(2):504-511. (Kuhn et al., "The Constitution of lacto-N-tetraose," Chem. Ber., 1956, 89(2):504-511.).
Kuhn et al., "Kristallisierte Fucosido-lactose," Chemische Berichte, 1956, 89(11):2513. (Kuhn et al., "Crystallized Fucosidolactose," Chem. Ber., 1956, 89(11):2513.).
Kuhn et al., "Lacto-N-triose I und Lacto-N-triose II," Chemische Berichte, 1956, 89(11):1027-1033. (Kuhn et al., "Lacto-N-triose I and lacto-N-triose II," Chem. Ber., 1956, 89(4):1027-1033.
Kuhn et al., "The Constitution of lacto-N-biose I," Chem. Ber., 1954, 87(10):1553-1560.
Tadasu Usashima, et al., Milk Oligosaccharides, Nova Biomedical Books, (2011), New York ISBN 978-1-61122-831-1, 1-53.

(Continued)

*Primary Examiner* — Layla D Berry
(74) *Attorney, Agent, or Firm* — Kelly Reynolds

(57) ABSTRACT

Disclosed is a process for the purification of LNnT (lacto-N-neotetraose) from a fermentation broth, the process comprises subjecting a fermentation broth to a first step of membrane filtration, thereby providing a filtrated solution, such filtrated solution is subjecting to a second step of simulated moving bed chromatography, obtaining a purified solution thereof, then subjecting this purified solution to a third step of crystallization, obtaining crystals containing the LNnT of interest, and subjecting the crystals to a fourth and final step of drying, thereby providing a highly purified powder of LNnT.

15 Claims, 27 Drawing Sheets

(56) References Cited

OTHER PUBLICATIONS

Claire Dumon, et al., "In vivo fucosylation of lacto-N-neotetraose and lacto-N-neohexaose by heterologous expression of Helicobacter pylori α-1, 3 fucosyltransferase in engineered *Escherichia coli*," Glycoconjugate Journal, (2001), vol. 18, No. 6: 465-474.

Florian Baumgartner, et al., "Synthesis of the Human Milk Oligosaccharide Lacto-N-Tetraose in Metabolically Engineered, Plasmid-Free *E. coli*," ChemBioChem Communications, (2014), vol. 15, No. 13: 1896-1900.

Georg A. Sprenger, Florian Baumgärtner, and Christoph Albermann., "Production of human milk oligosaccharides by enzymatic and whole-cell microbial biotransformations," Journal of Biotechnology, (2017), vol. 258: 79-91.

International Search Report for Application No. PCT/EP2020/066018 mailed Aug. 21, 2020.

Bernard Priem, et al., "A new fermentation process allows large-scale production of human milk oligosaccharides by metabolically engineered bacteria," Glycobiology, (2002), vol. 12, No. 4 : 235-240.

\* cited by examiner

PROCESS FOR THE PURIFICATION OF LACTO-N-NEOTETRAOSE

CROSS-REFERENCE TO RELATED APPLICATIONS

This application is the National Stage entry of International Application No. PCT/EP2020/066018, filed 10 Jun. 2020, which claims priority to European Patent Application No. 19180396.4, filed 14 Jun. 2019.

BACKGROUND

Field

FIELD OF THE INVENTION

The present invention relates to a process for the purification of LNnT (lacto-N-neotetraose, Gal($\beta$1-4)GlcNAc($\beta$1-3)Gal($\beta$1-4)Glc). More specifically, the present invention relates to the separation of by-products, impurities and/or contaminants from LNnT obtained from a fermentation process, through a purification process.

Description of Related Art

Human milk is regarded as the best diet for the development of an infant. It is composed of fats, proteins, vitamins, minerals, trace elements and complex oligosaccharides. Besides lactose, human milk, as well as milk of other mammals, contains various structurally diverse oligosaccharides which are also known as human milk oligosaccharides (HMOs) (Usashima T. et al., (2011) Milk 20 Oligosaccharides, Nova Biomedical Books, New York ISBN 978-1-61122-831-1). Today it is thought that there are more than 150 structurally different oligosaccharides found in human milk. With very few exceptions, HMOs are characterized by a lactose disaccharide residue at their reducing ends on the one hand. On the other hand, many HMOs contain a fucose residue, a galactose residue or a N-acetylneuraminic acid residue at their non-reducing end. Furthermore, there are linear as well as branched representatives. Generally, the monosaccharide residues of HMOs are D-glucose, D-galactose, N-acetylglucosamine, L-fucose and N-acetyineuraminic acid (the latter better known as sialic acid or lactaminic acid). The importance of HMOs for infant nutrition is directly linked to their biological activities including protection of the neonate from pathogens, supporting development of the infant's immune system and cognitive abilities. In addition, HMOs serve as a substrate for beneficial bacteria like Bifidobacteria or Lactobacilli.

Due to the challenges involved in the chemical synthesis of human milk oligosaccharides, several enzymatic methods and fermentative approaches were developed. In particular, the fermentative approach requires purification of the desired oligosaccharide from a highly complex fermentation broth containing several hundreds of different individual compounds. The carbohydrate fraction of the fermentation broth alone is composed of a complex mixture of mono- and oligosaccharides as well as derivatives thereof including substrates (e.g. lactose, fructose, glucose, saccharose and other sugars used as carbon source), biosynthetic intermediates, individual monosaccharides (such as glucose, galactose, N-acetylglucosamine, fucose and N-acetylneuraminic acid), metabolic side products and other oligo- and polysaccharides synthesized by the microbe. Moreover, the structures of many of the oligosaccharides occurring in the fermentation broth are hard to identify (e.g. oligosaccharides produced by the synthesizing host naturally like cell surface glycosylation structures or oligosaccharides produced by the organism as a result of stress). Thus, in many cases the purification of a biotechnological product can be much more expensive and time-consuming than its production by fermentation.

In particular, the fermentation of lacto-N-neotetraose is often associated with an excessive synthesis of lacto-N-triose II (LNT II, GlcNAc($\beta$1-3)Gal($\beta$1-4)Glc), a biosynthetic intermediate in the biosynthesis of lacto-N-neotetraose, which is often exported from the cell into the medium before being further converted to aimed LNnT. Furthermore, para-lacto-N-neohexaose (pLNnH, Gal($\beta$1-4)GlcNAc($\beta$1-3)Gal($\beta$1-4)GlcNAc($\beta$1-3)Gal($\beta$1-4)Glc) often occurs as a side product when LNnT is further converted with N-acetylglucosamine (GalNAc) and glucose instead of being exported and even para-lacto-N-neooctaose (pLNnO, Gal($\beta$1-4)GlcNAc($\beta$1-3)Gal($\beta$1-4)GlcNAc($\beta$1-3)Gal($\beta$1-4)GlcNAc($\beta$1-3)Gal($\beta$1-4)Glc has been detected as an additionally prolonged derivative. The last side-products are represented through glucosyllactose (GlcLac), galactosyllactose (GalLac), glucosylated LNnT and galactosylated LNnT, which are formed during the fermentation. However, oligosaccharides which carry GalNAc at the non-reducing end such as lacto-N-triose II or intermediates for pLNnH or pLNnO can be effectively removed by a glycosidase treatment. In addition, autoclaving (heat treatment) of carbohydrates (for example sucrose or lactose) can lead to the formation of unwanted side products such as aldol- or Maillard-products. Isomerization reactions (e.g. conversion of lactose to lactulose) can furthermore bring in larger contaminations in general and create oligosaccharide-isomers. In order to avoid side product formation due to heat treatment, substrates and C-sources are often sterile filtered, which however imposes a risk of foreign growth contamination.

For the production of human milk oligosaccharides by microbial fermentation, recombinant microorganisms (recombinant bacterial or yeast strains) are used. Thus, these fermentation processes are relying in genetically modified organisms (GMOs), which are regarded highly critical in the food industry sector. Thus, the desired products have to be consequently purified from GMO process residuals such as cells, cell fragments, endotoxins and excessive salts to obtain customer and regulatory authority acceptance. lacto-N-neotetraose has therefore to be purified from a fermentation broth comprising a complex mixture made of recombinant nucleic acids such as DNA and RNA as well as from recombinant proteins. Additionally, microbial fermentation in particular contains significant amounts of endotoxins when E. coli is employed. However, contamination of a product for human consumption with recombinant DNA, endotoxins or proteins is neither acceptable by regulatory authorities nor by consumers. Thus, any nucleic acids and proteins resulting from the recombinant microorganism need to be removed from the desired human milk oligosaccharide.

The known processes for purifying individual oligosaccharides are technically complex and often uneconomical, especially when these raw compounds are obtained as a mixture of several similarly build constructs from a fermentation broth, in particular when said oligosaccharide is intended for food applications. For the industrial purification of food-grade disaccharides lactose or sucrose from complex mixtures such as whey or molasses, productive ton-scale processes have been developed which involve multiple crystallization steps. However, HMO in general and more specifically, lacto-N-neotetraose proved up to today, to be difficult to purify especially when derived from a fermentation broth. In the case of LNnT, a process has been developed to synthetically produce and subsequently crystallize the resulting product to allow its use as food ingredient. But in this process, no hub products from a fermentation are contained but the process yields a nearly pure product, which is then isolated for economic reasons as a crystalline material to then be further processed.

Early work in the isolation, characterization and crystallization of diverse HMOs was done by Richard Kuhn and co-workers in the 1950s, where these compounds were isolated from the mothers milk carbohydrate fraction via chromatographic purification on activated charcoal/celite columns. The first HMO to be crystallized from Kuhn et. al was lacto-N-biose I (Kuhn et al., Chem. Ber. 1954, 87(10), 1553-1560) followed by a myriad of other carbohydrates in the following years: lacto-N-tetraose (Kuhn et al., Chem. Ber. 1953, 86(6), 827-830; Chem. Ber. 1954, 87(3), 289-300; Chem. Ber. 1956, 89(2), 504-511), lacto-N-fucopentaose I (Kuhn et al., Chem. Ber. 1956, 89(11), 2514-2523), 2'-fucosyllactose (Kuhn et al., Chem. Ber. 1955, 88(8), 1135-1146; 1956, 89(11), 2513), lacto-N-triose I & II (Kuhn et al., Chem. Ber. 1956, 89(4), 1027-1033) and lacto-N-neotetraose (Kuhn et al., Chem. Ber. 1962, 95(11), 518-522).

For the purification of lacto-N-neotetraose and the closely related human milk oligosaccharide lacto-N-tetraose (Gal ($\beta$1-3)GlcNAc($\beta$1-3)Gal($\beta$1-4)Glc) chromatographic processes were employed, in particular gel filtration chromatography (Dumon et al., 2001 Glycoconj. J. 18(6), 465-474; Priem et al., Glycobiology 2002, 12(4), 235-240; Baumgartner et al., Chem. Bio. Chem. 2014 15(13), 1896-1900, Sprenger et al., 2017, J. Biotechnol. 258, 79-91). In this regard, purification through gel filtration chromatography is not suitable for food products on industrial scale, however, simulated moving bed chromatography can be considered as a suitable method for the purification of LNnT for food production, in combination with other purification steps to yield a purified LNnT as a final product.

In the microbial fermentation of lacto-N-neotetraose, many other carbohydrates such as trioses (LNT II, GlcLac, GalLac) as well as longer chain oligosaccharides such as hexaoses (pLNnH) may be formed, too. Furthermore, hydrolysis products of the produced oligosaccharides are formed during the fermentation and work-up process. Using a purification process which includes several purification steps, LNnT can be obtained in higher amounts, higher purities and higher yields, making it suitable as an ingredient in food formula or for cosmetic or medical applications.

The process of the present invention, represents a cost-efficient alternative to prior art processes yielding a solid powder product, and is particularly relevant for the purification of lacto-N-neotetraose for nutritional applications and in particular for infant and toddler nutritional products, medical nutrition products, dietary supplements or general nutrition products.

To overcome all these drawbacks from the known processes, the present invention provides a novel purification process, simple, cost effective and scalable, for the purification of lacto-N-neotetraose obtained from a fermentation process.

SUMMARY

The present invention concerns a simple and economical process for the purification of lacto-N-neotetraose from microbial fermentation. By the microbial fermentation of lacto-N-neotetraose several other carbohydrates such as trioses, and longer chain oligosaccharides such as hexaoses may be formed, too. Furthermore, hydrolysis products of the produced oligosaccharides are formed during the fermentation and work-up process.

It is an object of the present invention to provide a simple, cost effective and scalable process for obtaining a purified lacto-N-neotetraose obtained from a fermentation process, as a main product, whereas by-products, impurities and/or other contaminants, such as lacto-N-triose II and/or para-lacto-N-neohexaose and/or para-lacto-N-neooctaose and/or glucosyllactose and/or galactosyllactose are separated from such main product.

It is yet another object of the present invention to provide lacto-N-neotetraose with a purity of $\geq$65%, $\leq$70%, $\leq$75%, $\leq$80%, $\leq$85%, $\leq$90%, and $\leq$95%.

DETAILED DESCRIPTION

Figure 1:
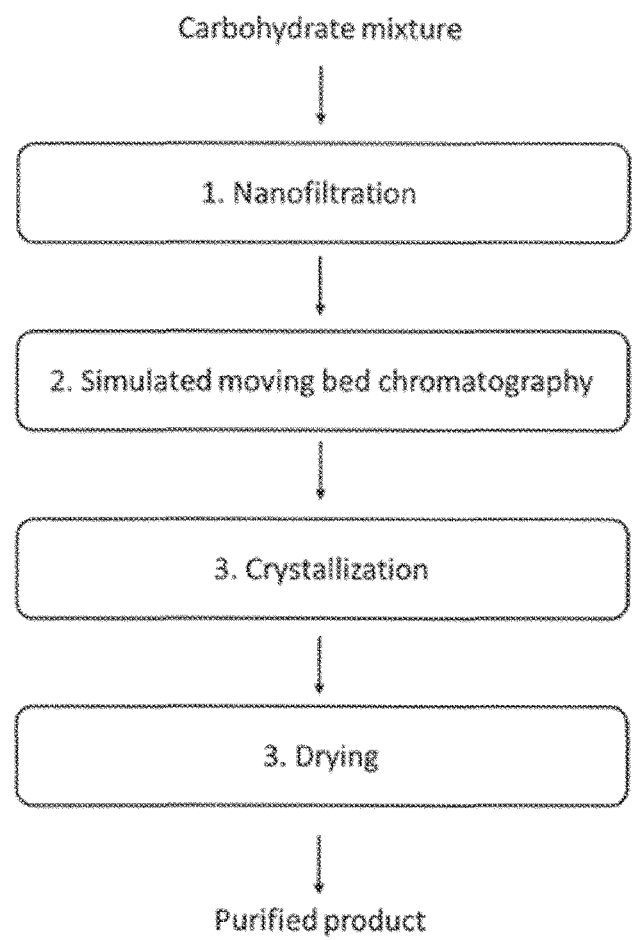
FIG. 1 shows a general scheme of the steps of the purification process according to the present invention.
Figure 2:
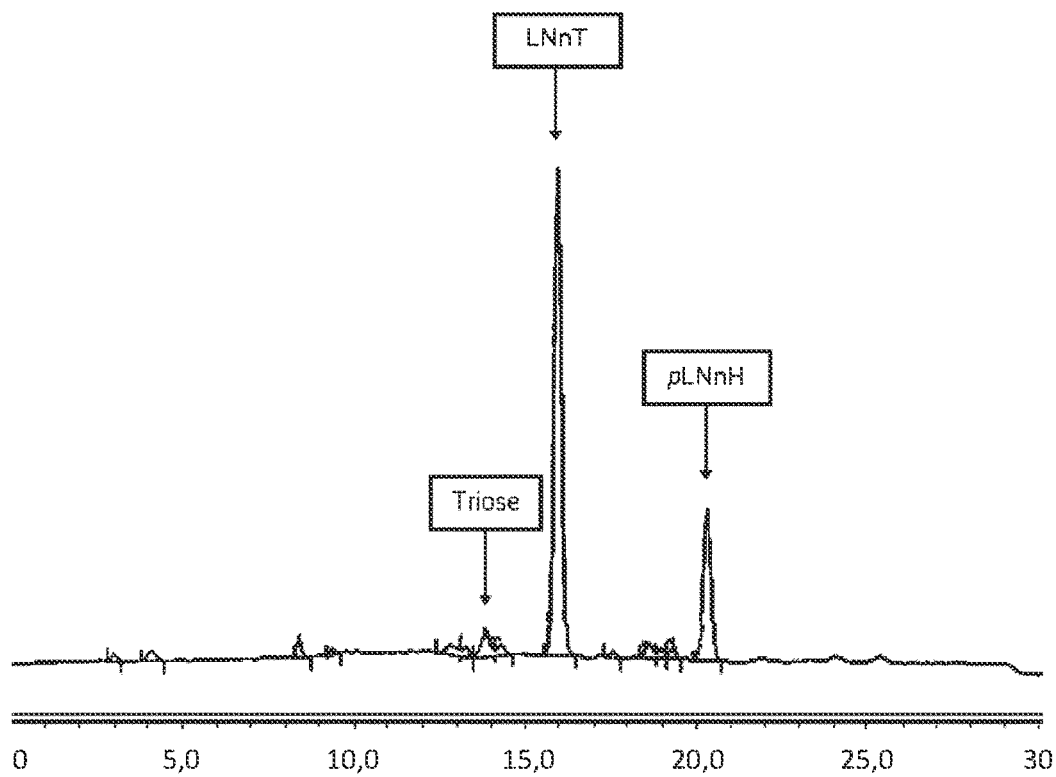
FIG. 2 shows the retentate analysis of Example 1 for a retentate volume of 80 L.
Figure 3:
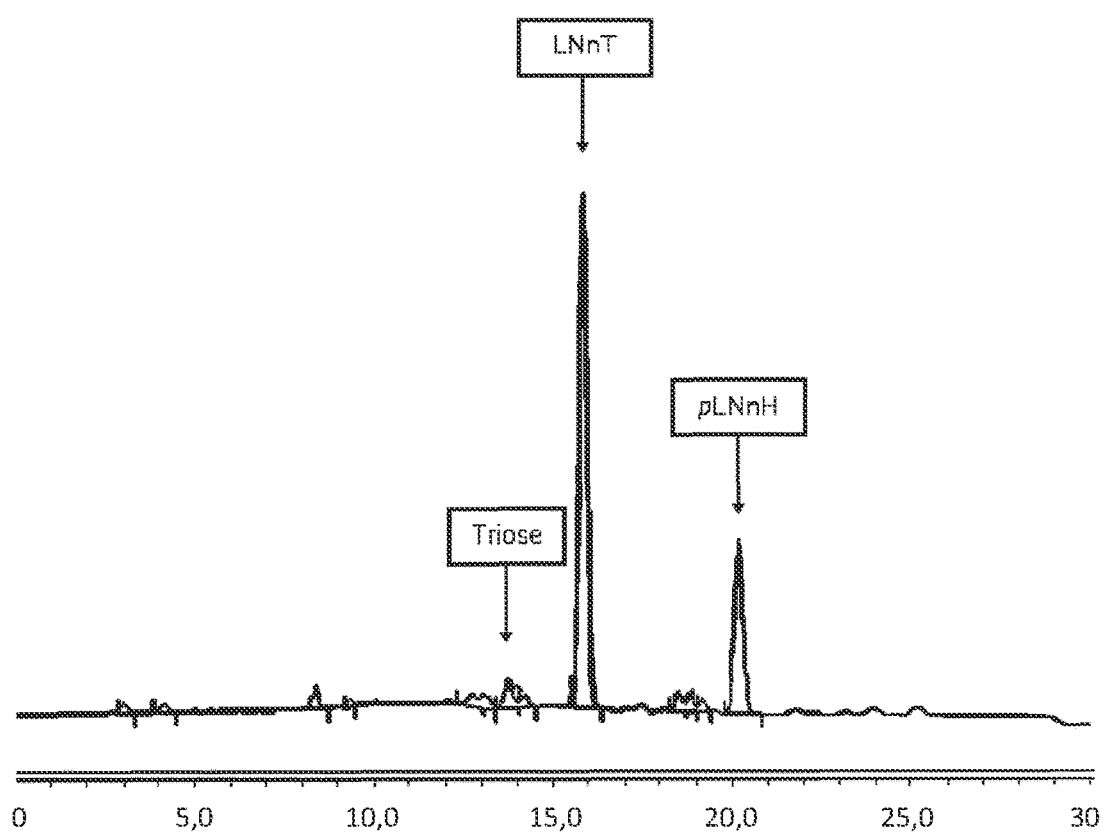
FIG. 3 shows the retentate analysis of Example 1 for a retentate volume of 60 L.
Figure 4:
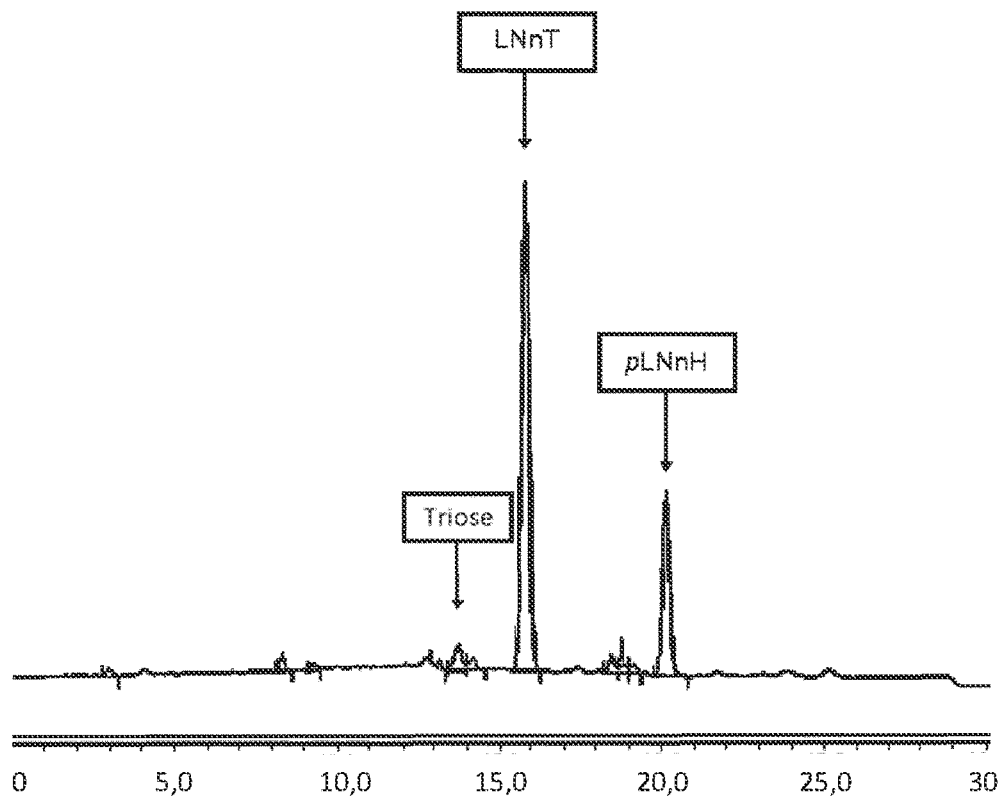
FIG. 4 shows the retentate analysis of Example 1 for a retentate volume of 40 L.
Figure 5:
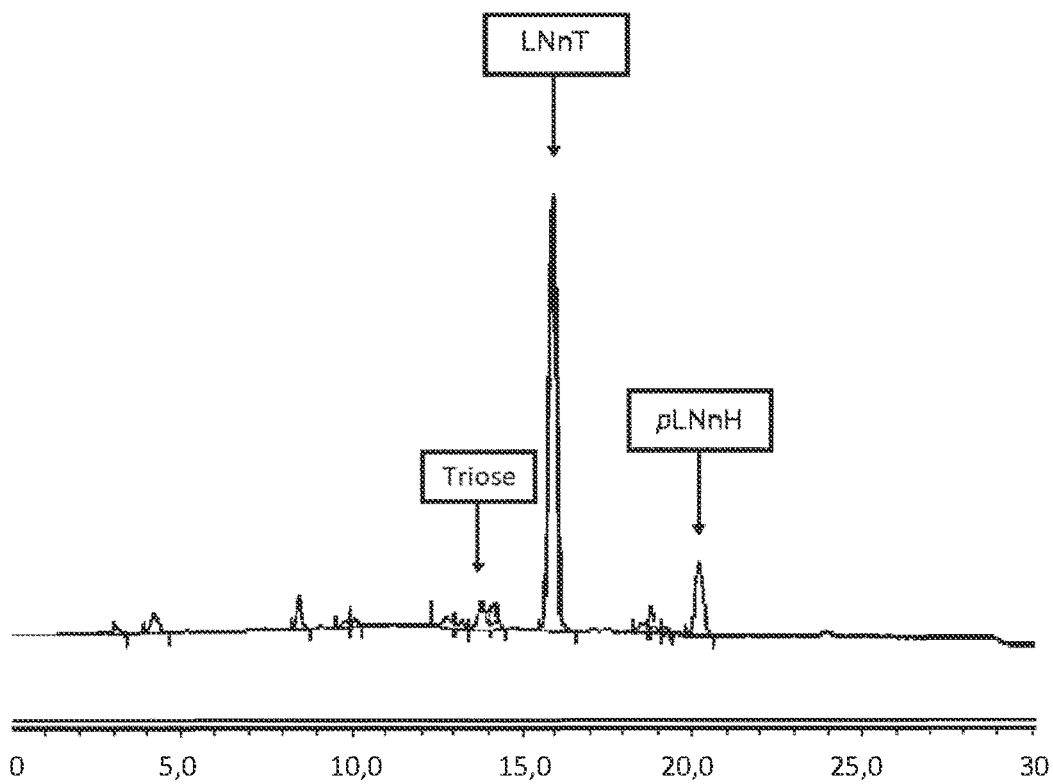
FIG. 5 shows the permeate analysis of Example 1 for a retentate volume of permeate 1 of 20 L.
Figure 6:
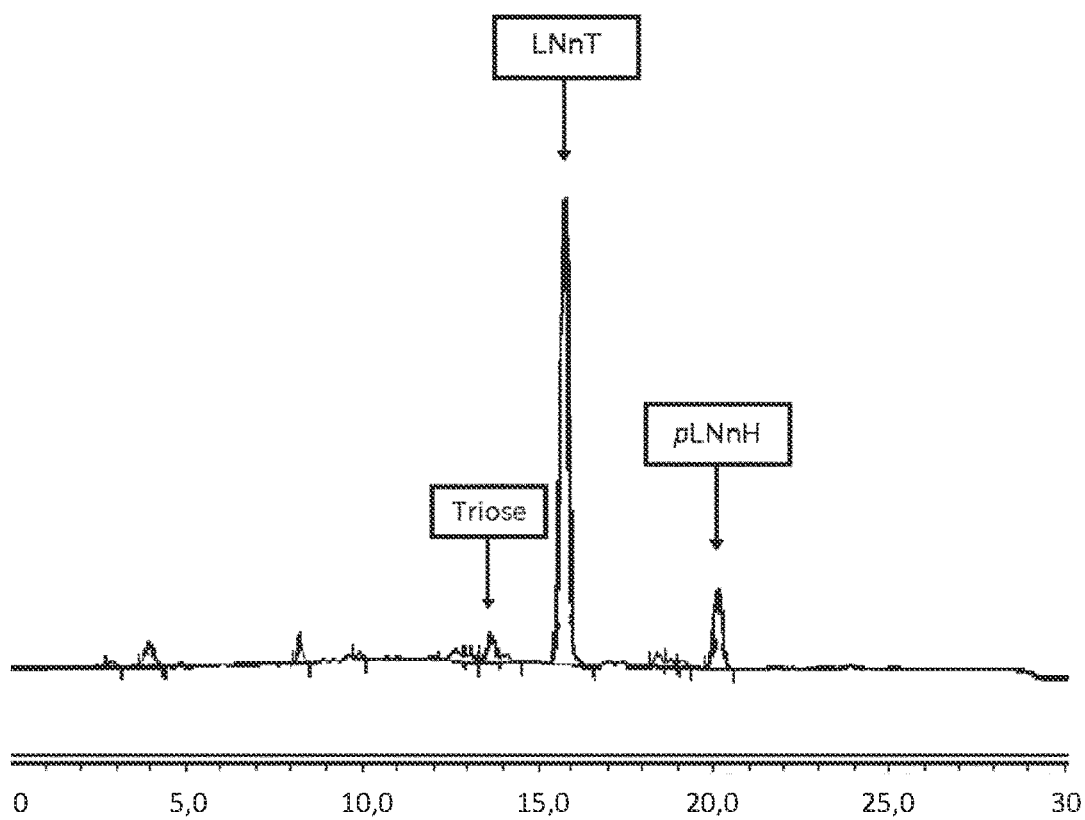
FIG. 6 shows the permeate analysis of Example 1 for a retentate volume of permeate 2 of 20 L.
Figure 7:
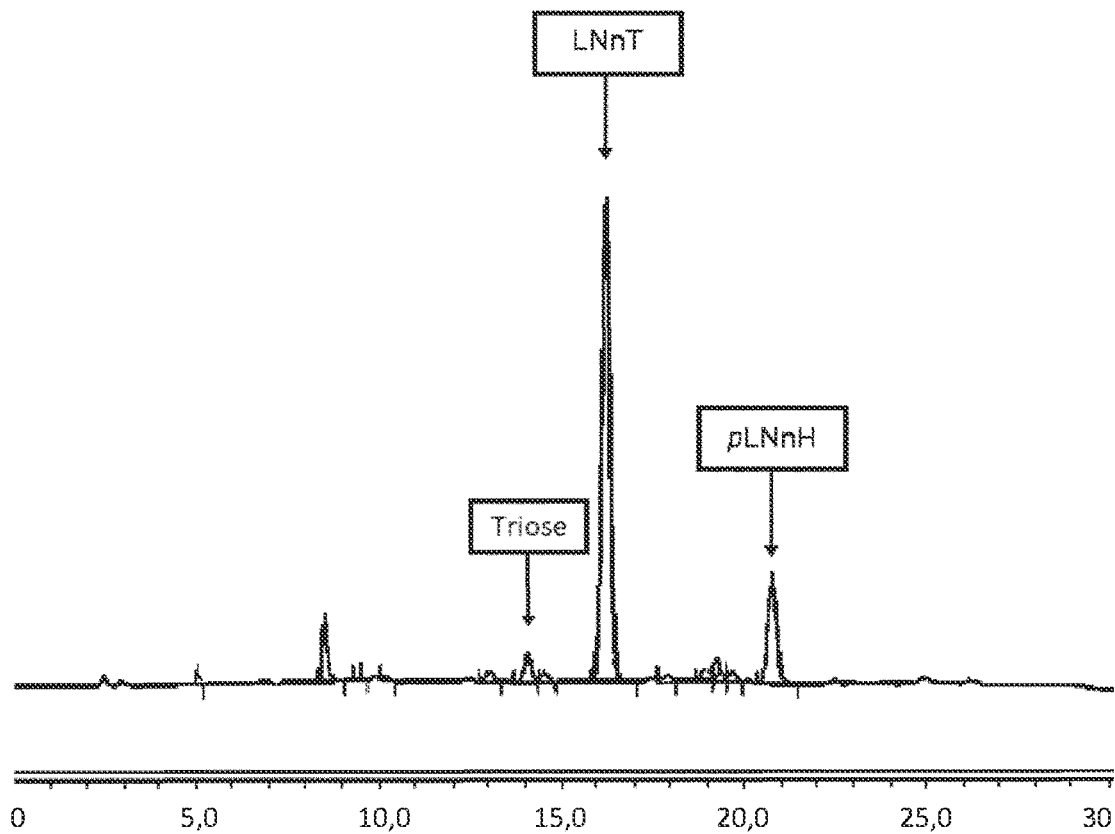
FIG. 7 shows a HILIC-CAD (Hydrophilic interaction liquid chromatography coupled to a charged aerosol detector) spectrum of the carbohydrate mixture used in example 4.
Figure 8:
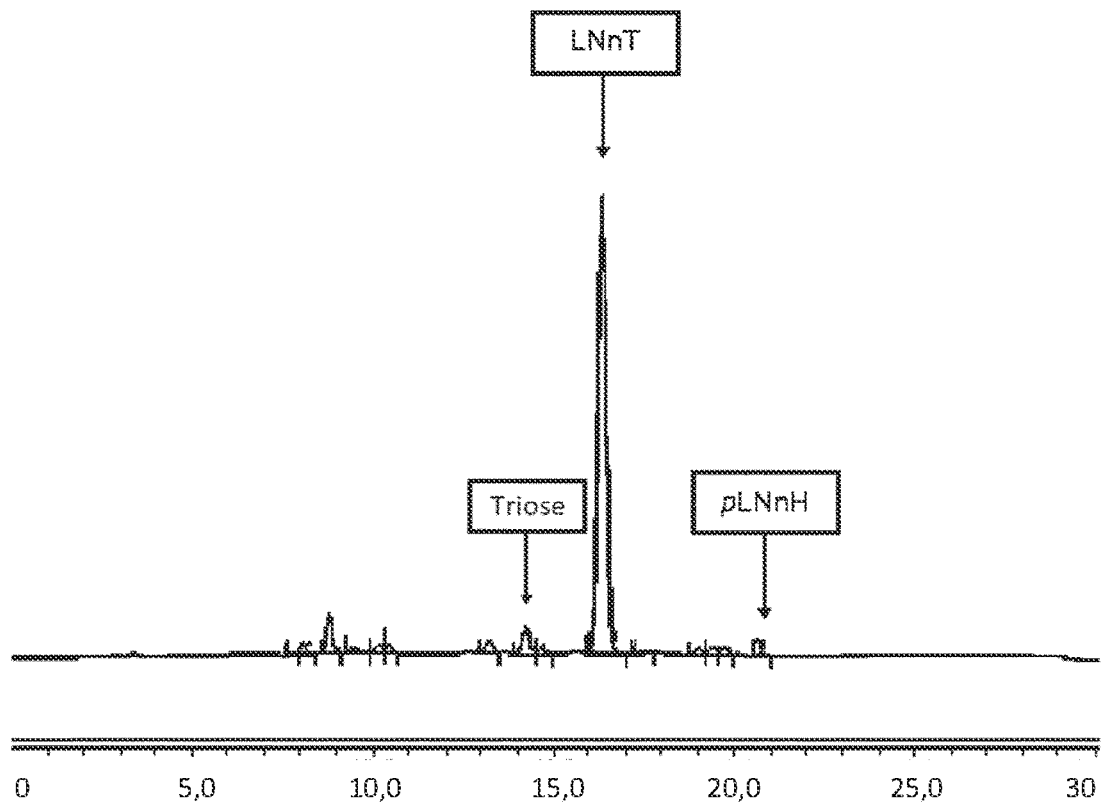
FIG. 8 shows a HILIC-CAD (Hydrophilic interaction liquid chromatography coupled to a charged aerosol detector) spectrum of the carbohydrate mixture used in example 4.
Figure 9:
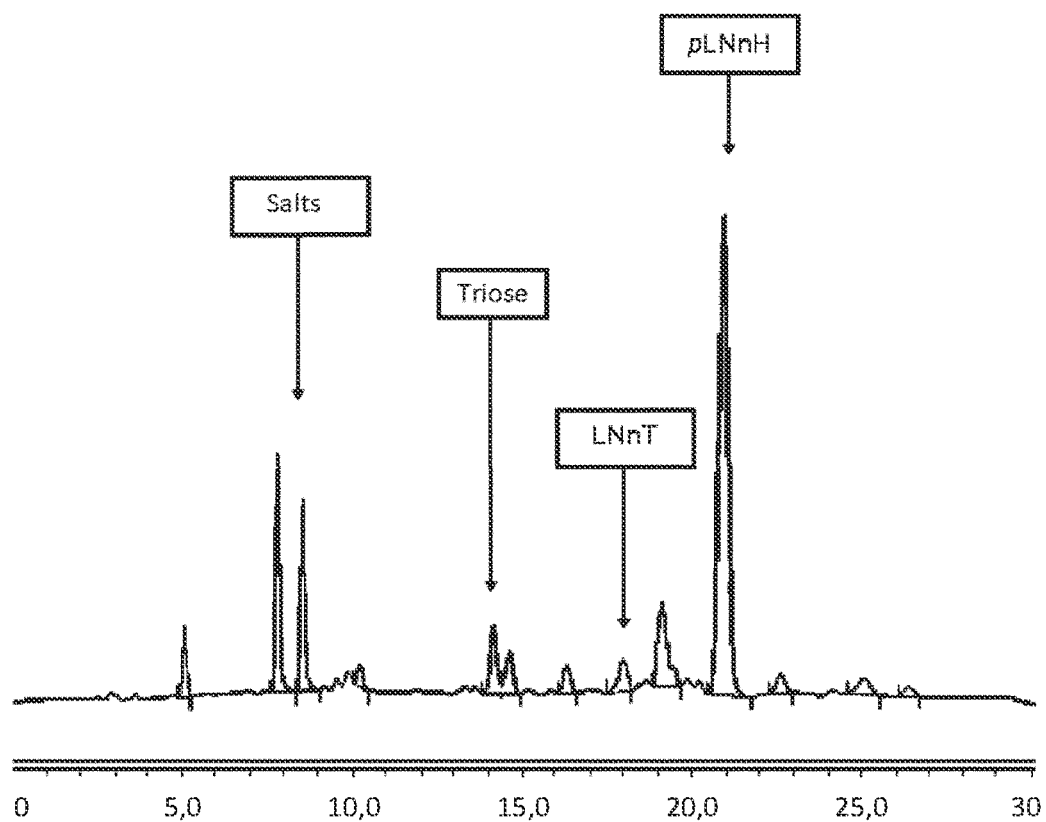
FIG. 9 shows a HILIC-CAD (Hydrophilic interaction liquid chromatography coupled to a charged aerosol detector) spectrum of the carbohydrate mixture used in example 4.
Figure 10:
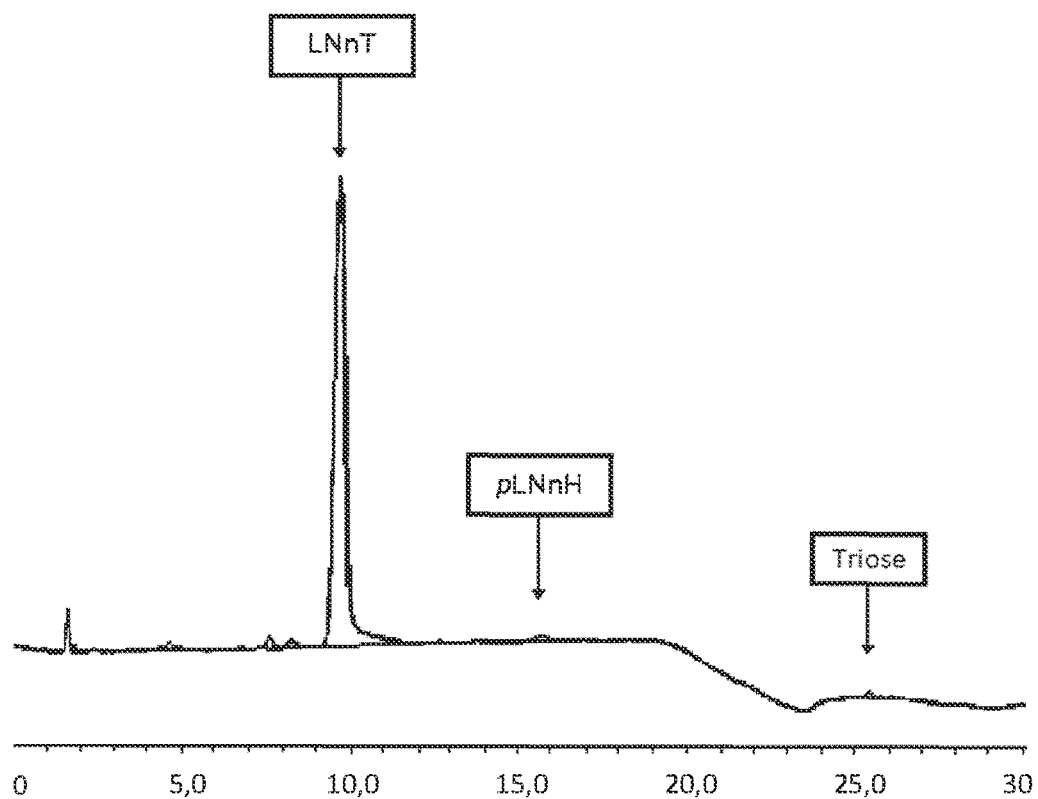
FIG. 10 shows a HPAEC-PAD (High performance anion exchange chromatography with pulsed amperometric detection) spectrum of the carbohydrate mixture obtained after crystallization in example 5.
Figure 11:
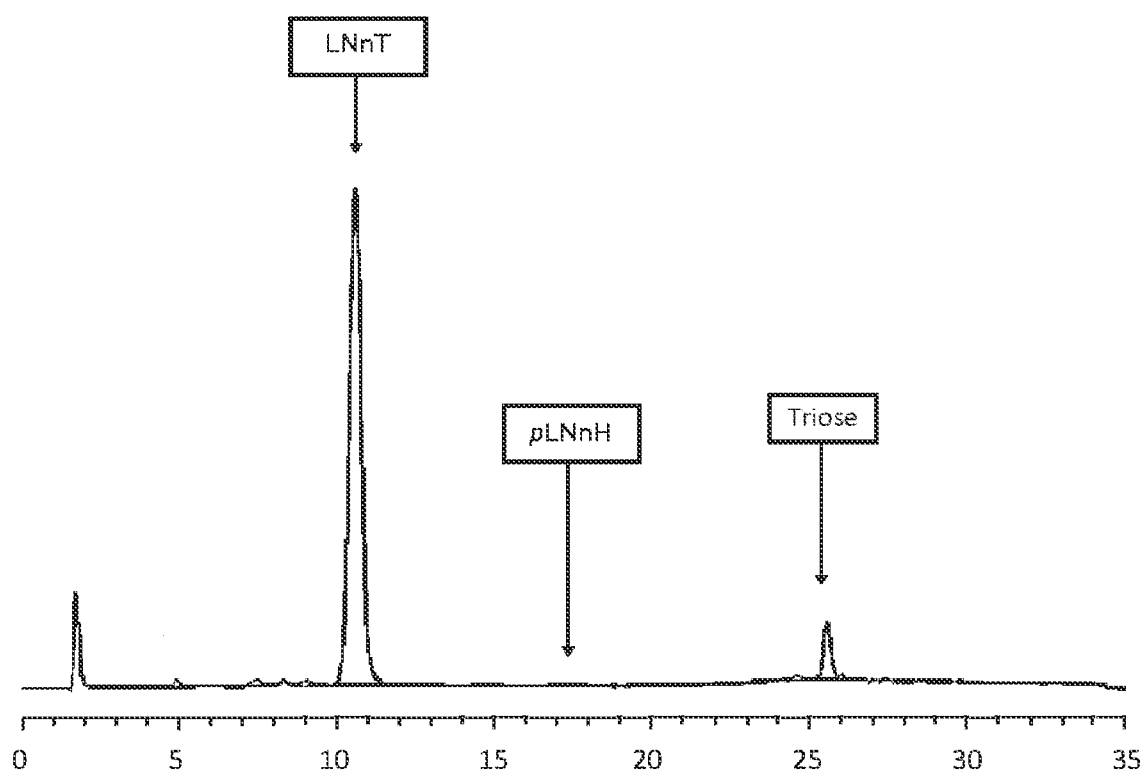
FIG. 11 shows a HPAEC-PAD (High performance anion exchange chromatography with pulsed amperometric detection) spectrum of the carbohydrate mixture obtained after the first crystallization in example 6.
Figure 12:
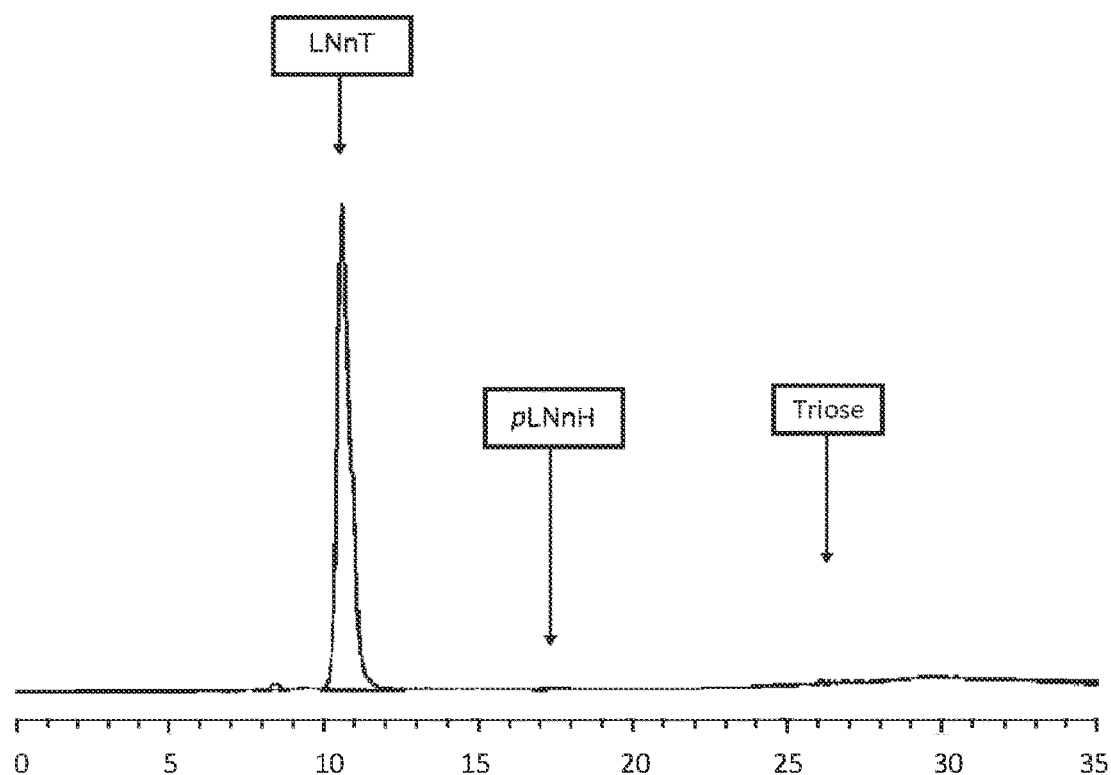
FIG. 12 shows a HPAEC-PAD (High performance anion exchange chromatography with pulsed amperometric detection) spectrum of the carbohydrate mixture obtained after the second crystallization in example 6.
Figure 13:
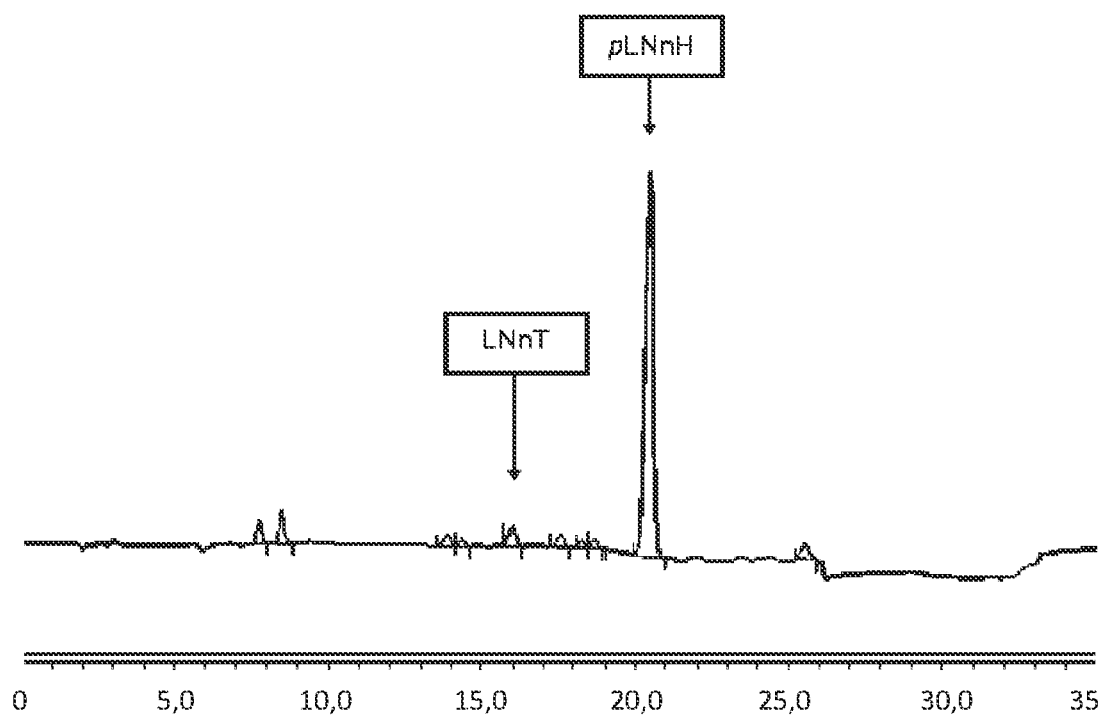
FIG. 13 shows a HILIC-CAD (Hydrophilic interaction liquid chromatography coupled to a charged aerosol detector) spectrum of the carbohydrate mixture obtained after the crystallization in example 7.
Figure 14:
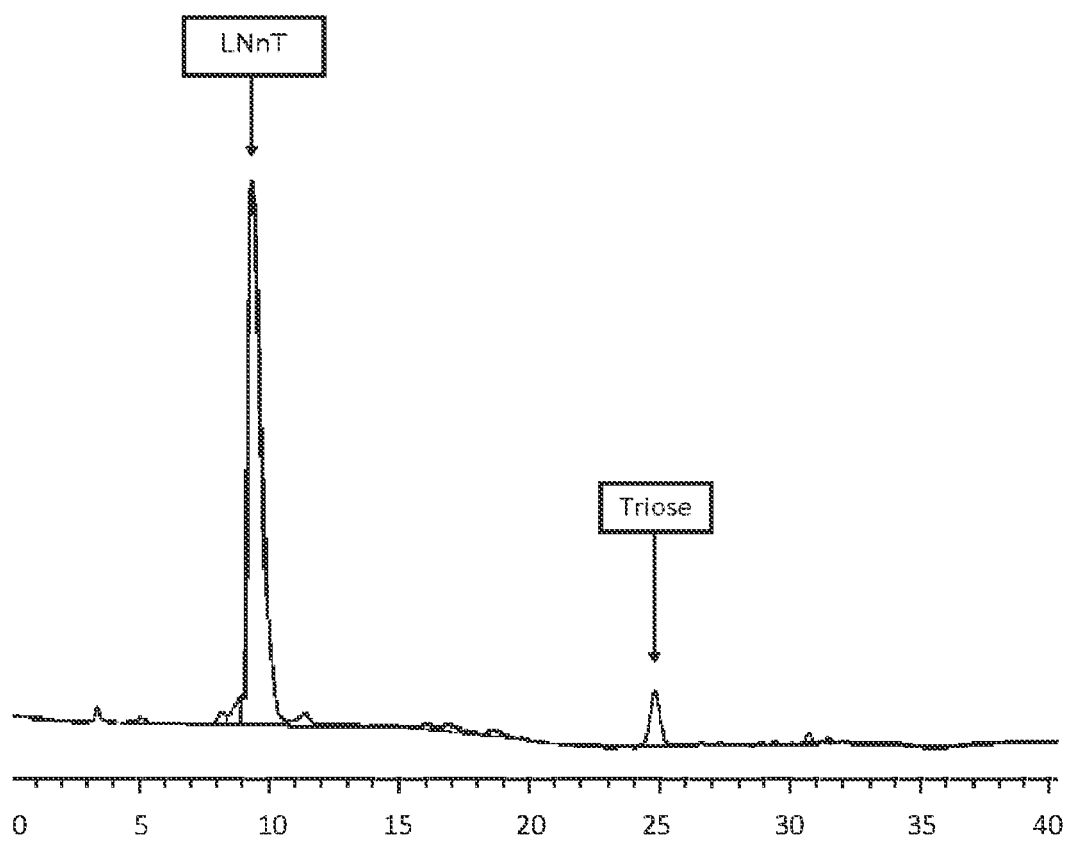
FIG. 14 shows a HPAEC-PAD (High performance anion exchange chromatography with pulsed amperometric detection) spectrum of the seed crystals obtained via gel filtration in example 8.
Figure 15:
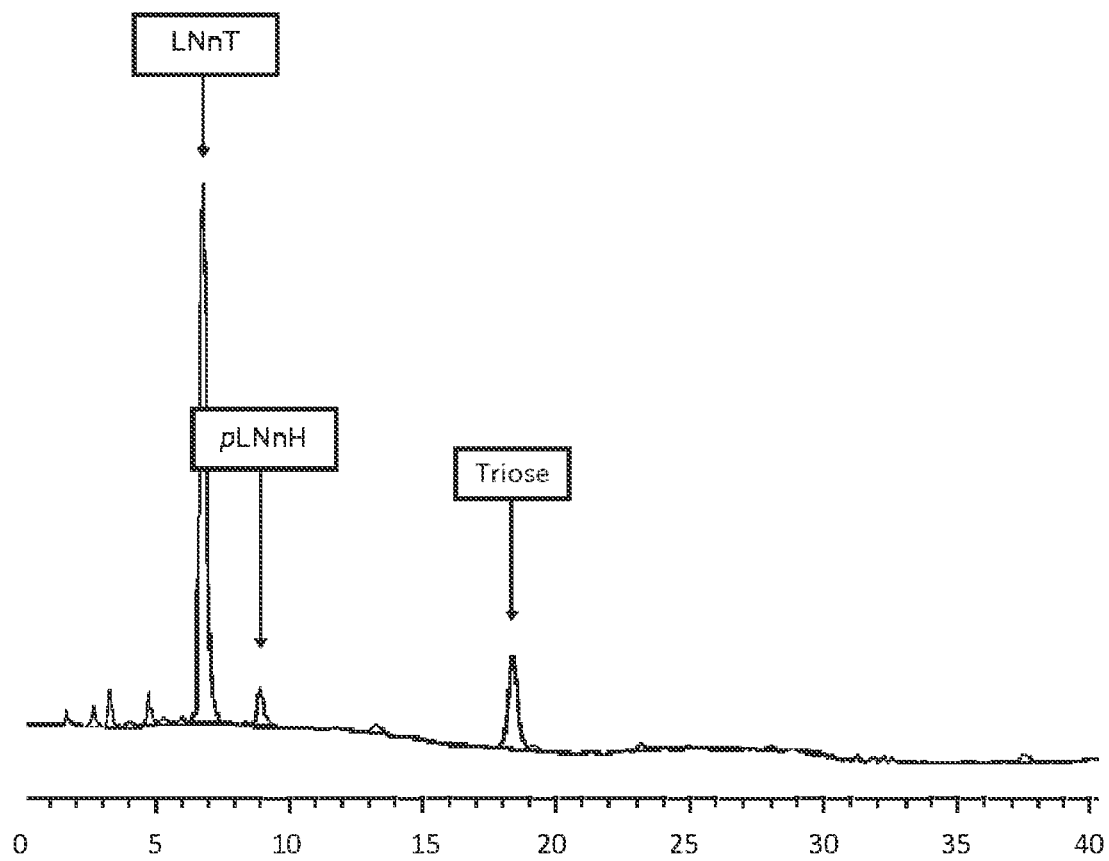
FIG. 15 shows a HPAEC-PAD (High performance anion exchange chromatography with pulsed amperometric detection) spectrum of the LNnT starting material used in example 9.
Figure 16:
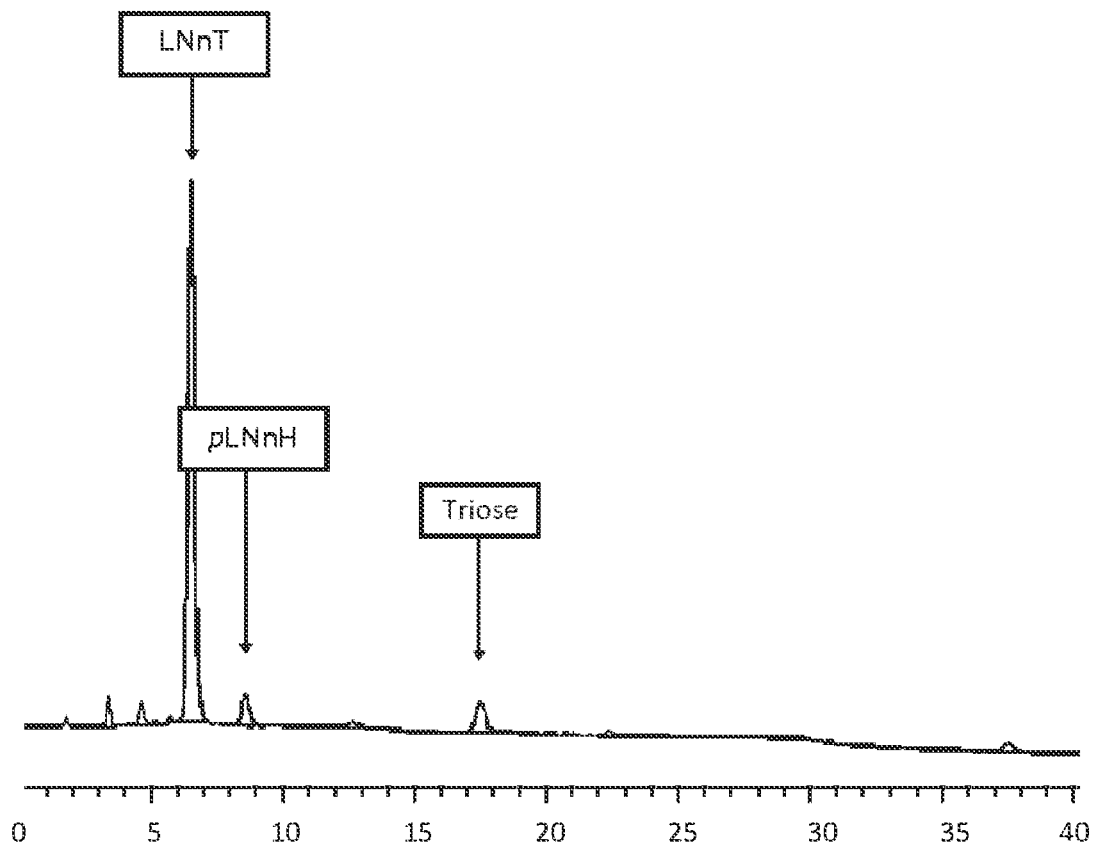
FIG. 16 shows a HPAEC-PAD (High performance anion exchange chromatography with pulsed amperometric detection) spectrum of the LNnT product obtained in example 9.
Figure 17:
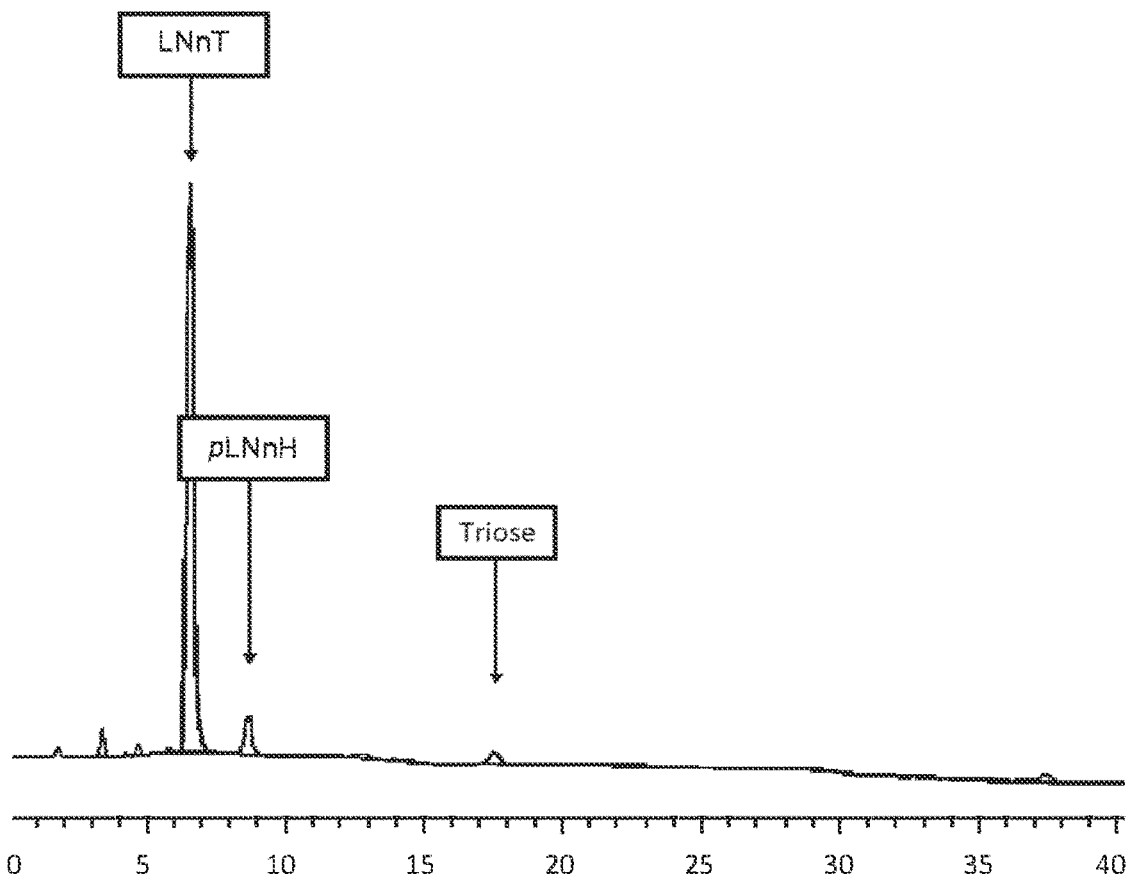
FIG. 17 shows a HPAEC-PAD (High performance anion exchange chromatography with pulsed amperometric detection) spectrum of the LNnT product obtained in example 10.
Figure 18:
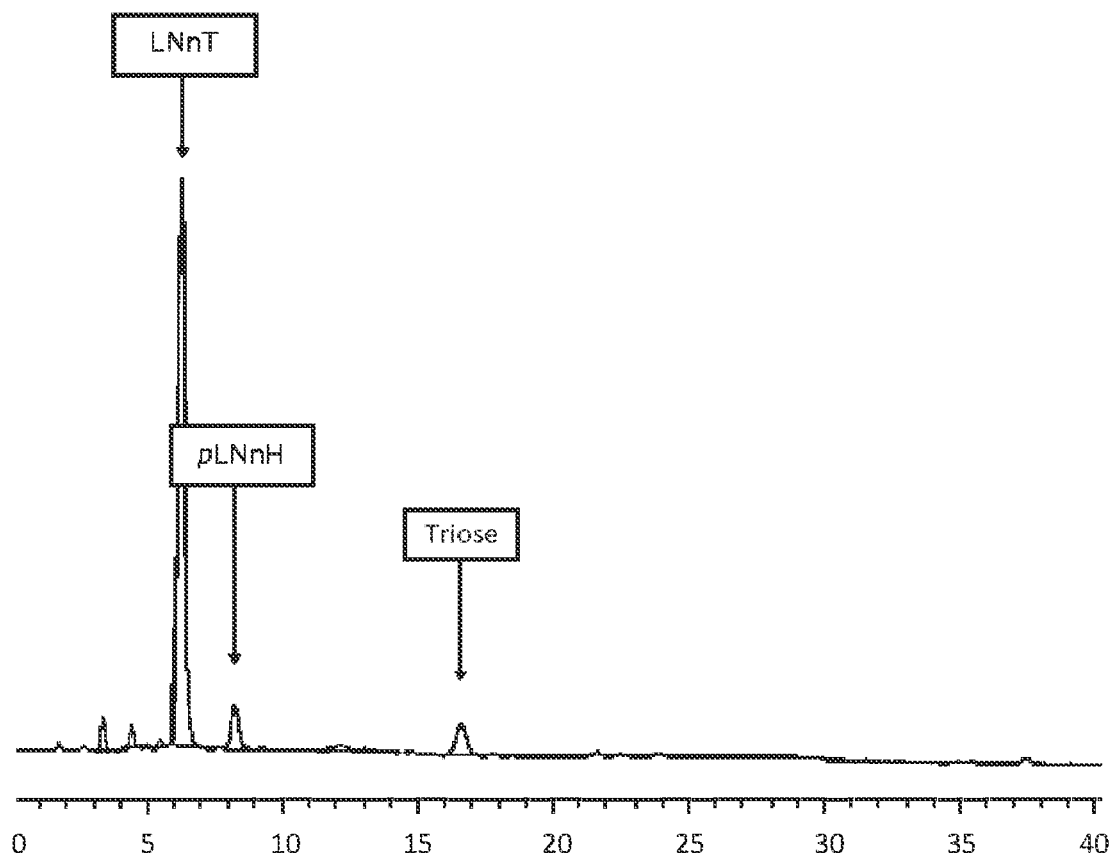
FIG. 18 shows a HPAEC-PAD (High performance anion exchange chromatography with pulsed amperometric detection) spectrum of the LNnT product obtained in example 11.
Figure 19:
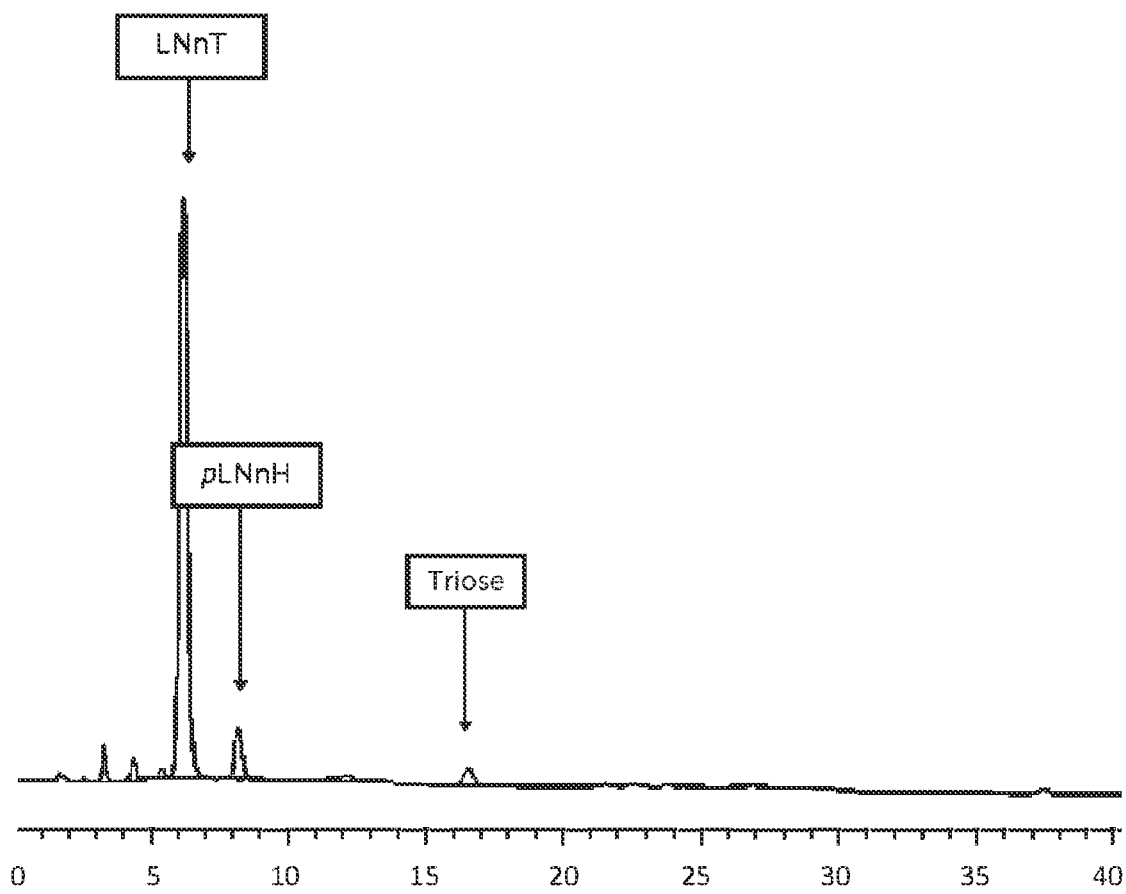
FIG. 19 shows a HPAEC-PAD (High performance anion exchange chromatography with pulsed amperometric detection) spectrum of the LNnT product obtained in example 12.
Figure 20:
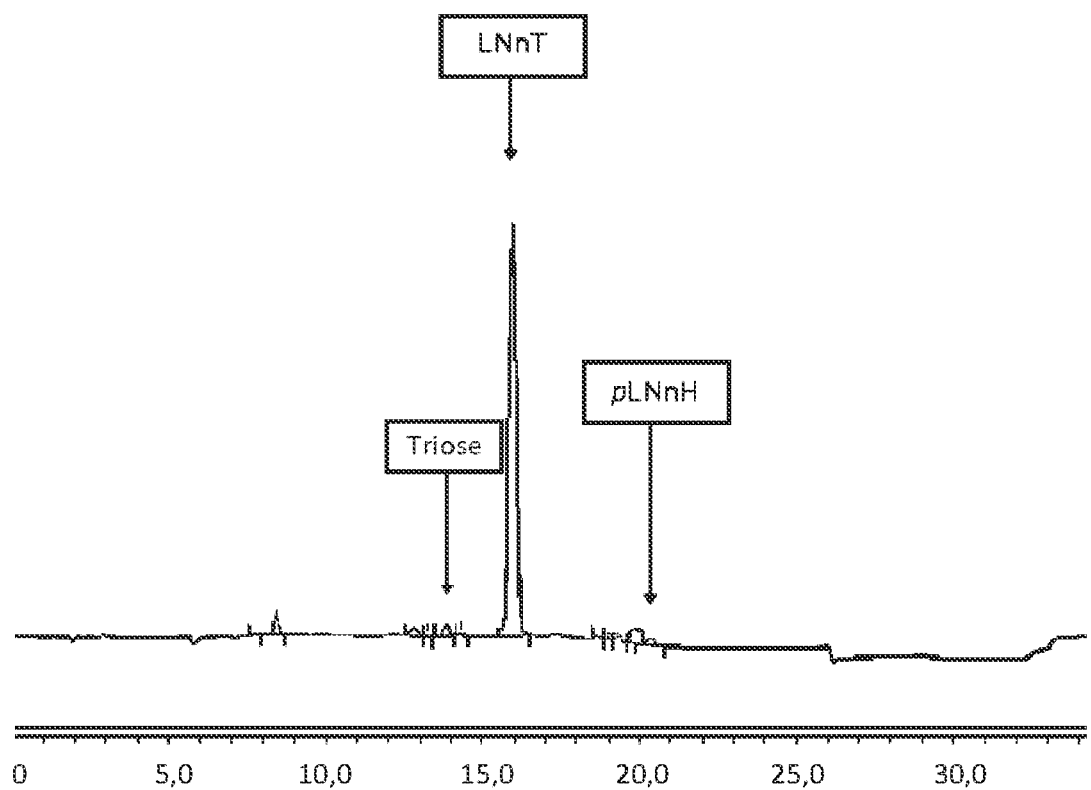
FIG. 20 shows a HILIC-CAD (Hydrophilic interaction liquid chromatography coupled to a charged aerosol detector) spectrum of the carbohydrate mixture obtained after homogenization in example 13.
Figure 21:
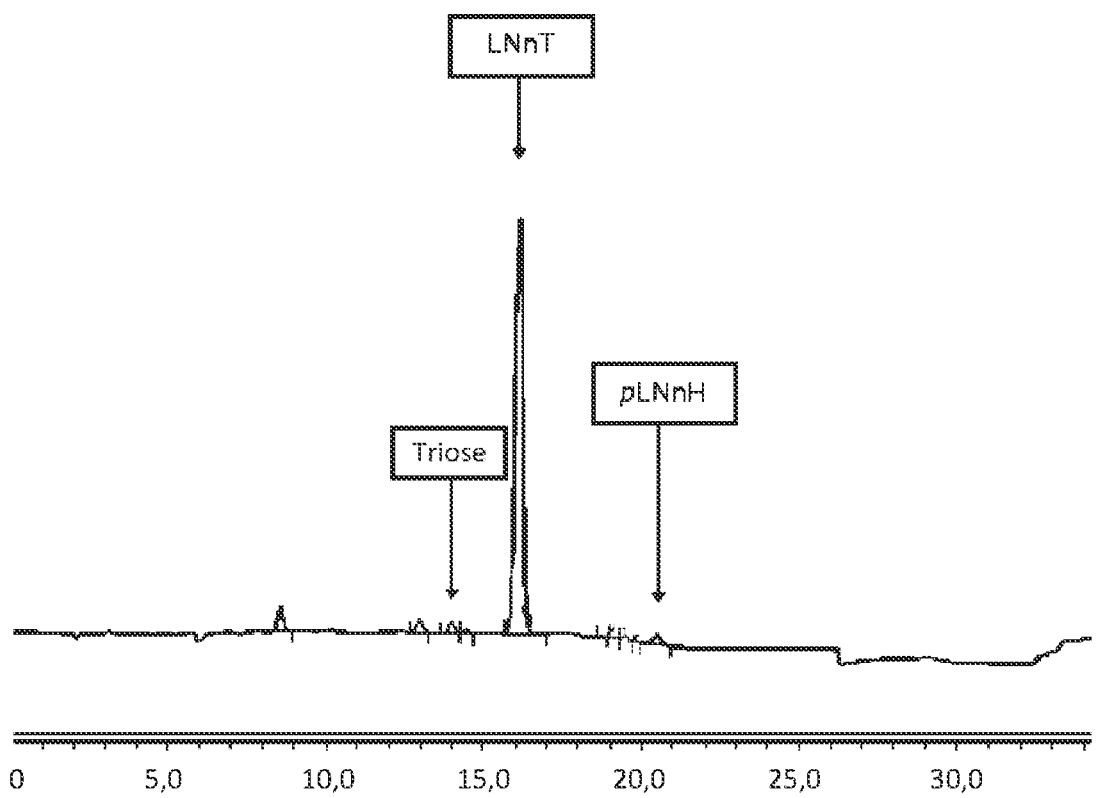
FIG. 21 shows a HILIC-CAD (Hydrophilic interaction liquid chromatography coupled to a charged aerosol detector) spectrum of the carbohydrate mixture obtained after homogenization in example 14.
Figure 22:
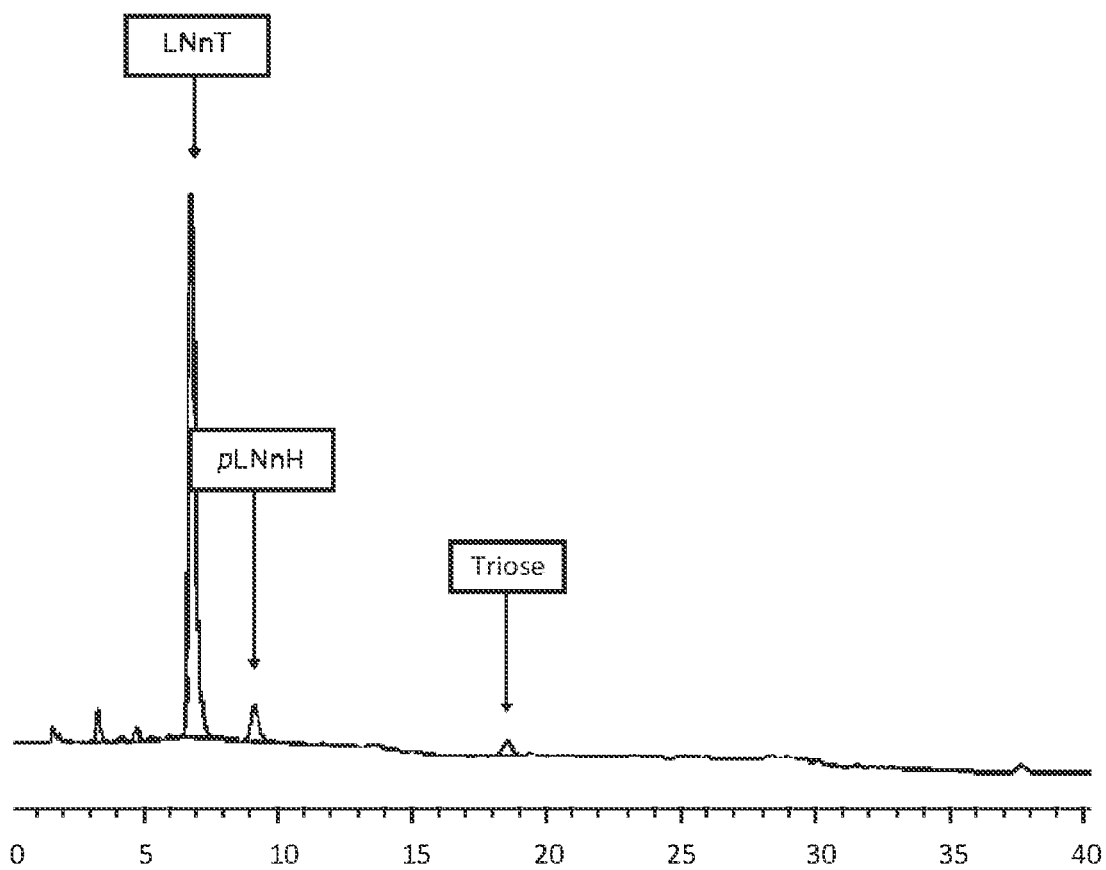
FIG. 22 shows a HPAEC-PAD (High performance anion exchange chromatography with pulsed amperometric detection) spectrum of the LNnT product obtained in example 15.
Figure 23:
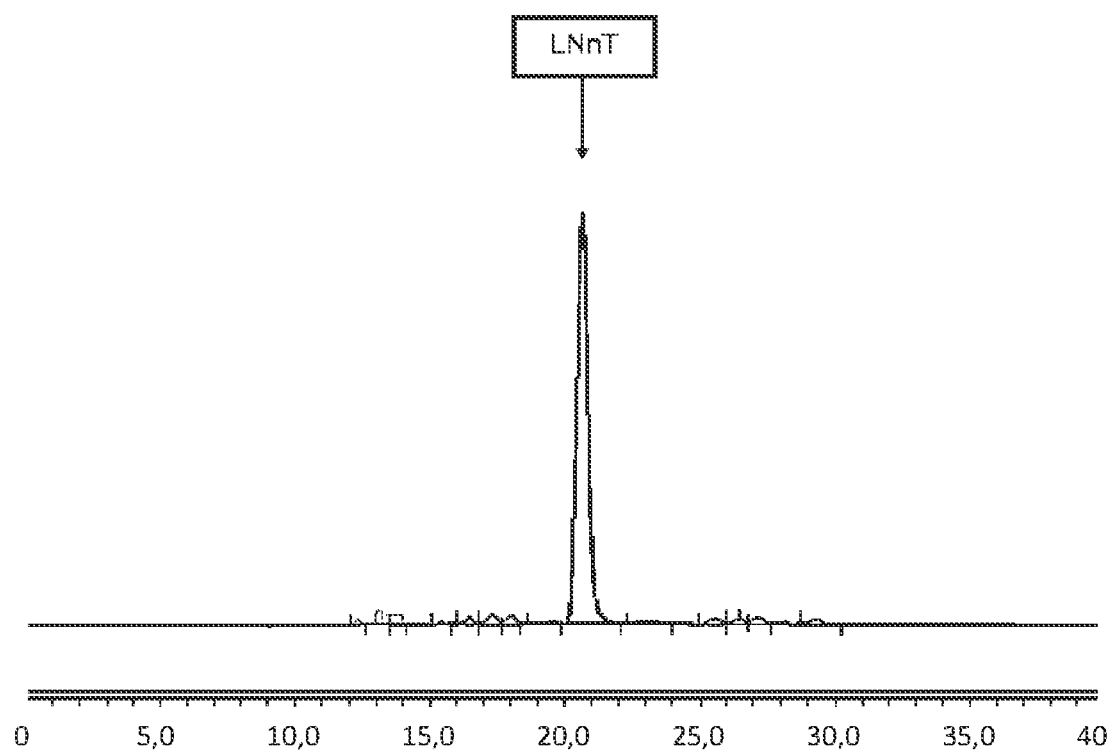
FIG. 23 shows a HILIC-CAD (Hydrophilic interaction liquid chromatography coupled to a charged aerosol detector) spectrum of the crystalline LNnT starting material used in examples 16 to 19.
Figure 24:
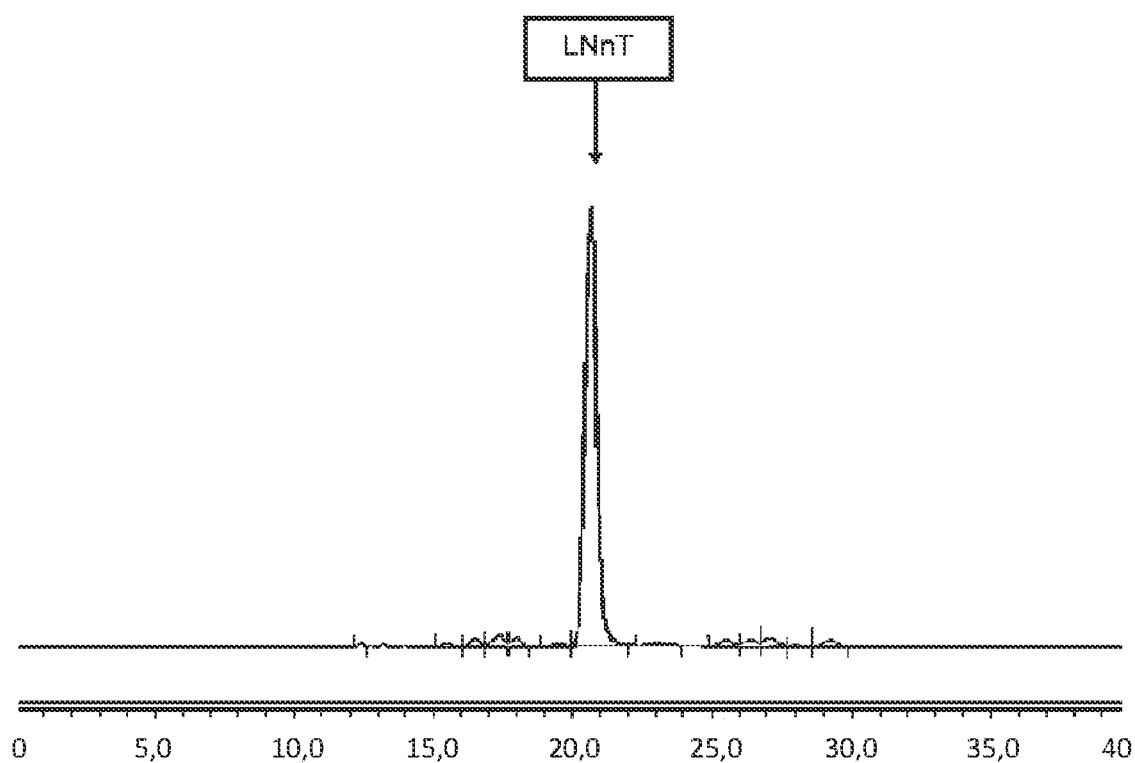
FIG. 24 shows a HILIC-CAD (Hydrophilic interaction liquid chromatography coupled to a charged aerosol detector) spectrum of the homogenized LNnT product obtained in example 17.
Figure 25:
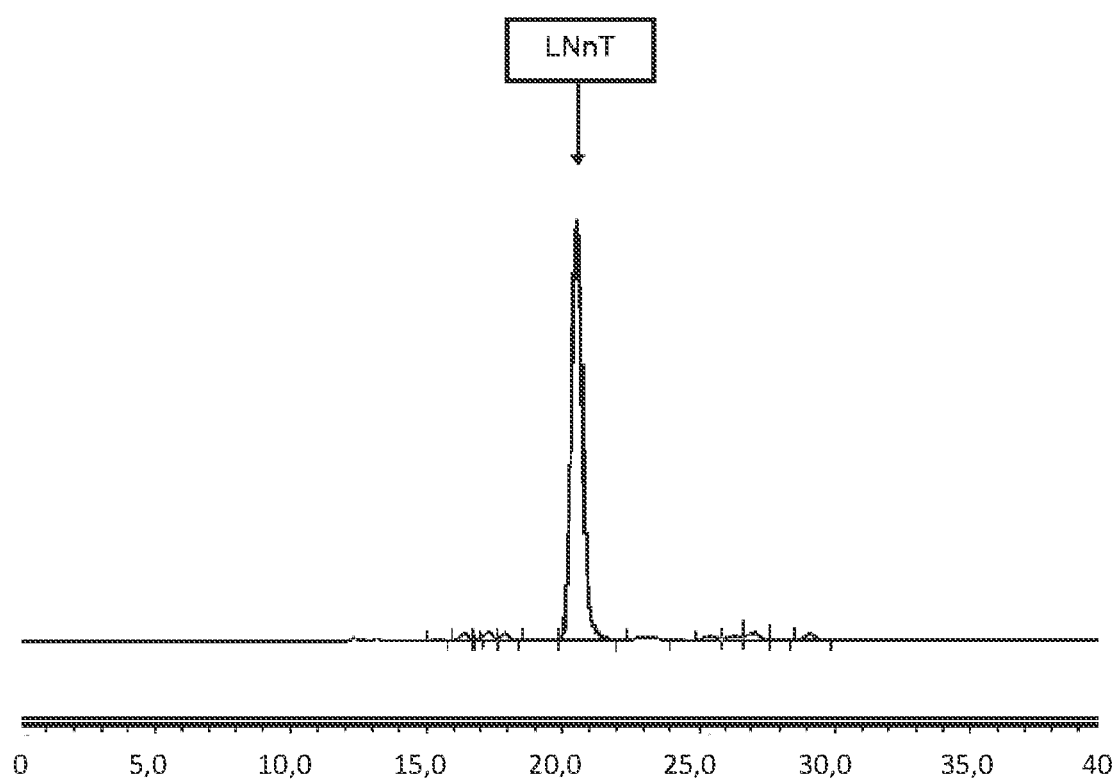
FIG. 25 shows a HILIC-CAD (Hydrophilic interaction liquid chromatography coupled to a charged aerosol detector) spectrum of the homogenized LNnT product obtained in example 18.
Figure 26:
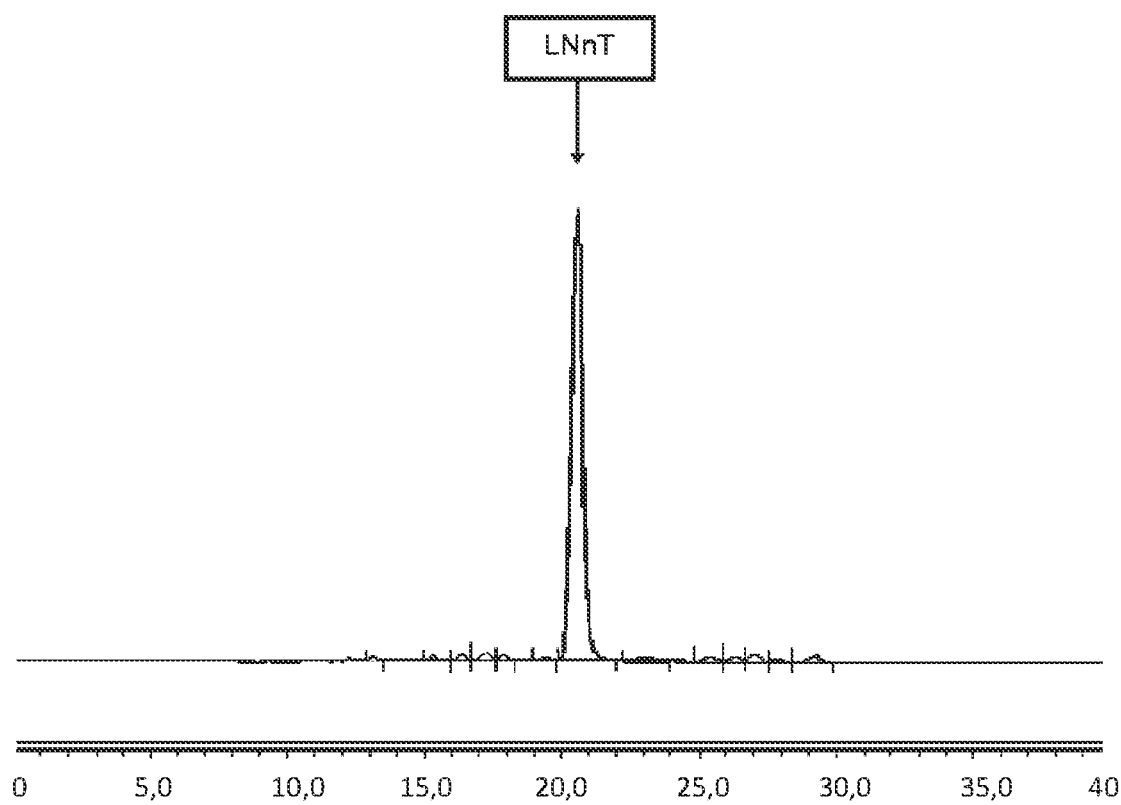
FIG. 26 shows a HILIC-CAD (Hydrophilic interaction liquid chromatography coupled to a charged aerosol detector) spectrum of the homogenized LNnT product obtained in example 19.
Figure 27:
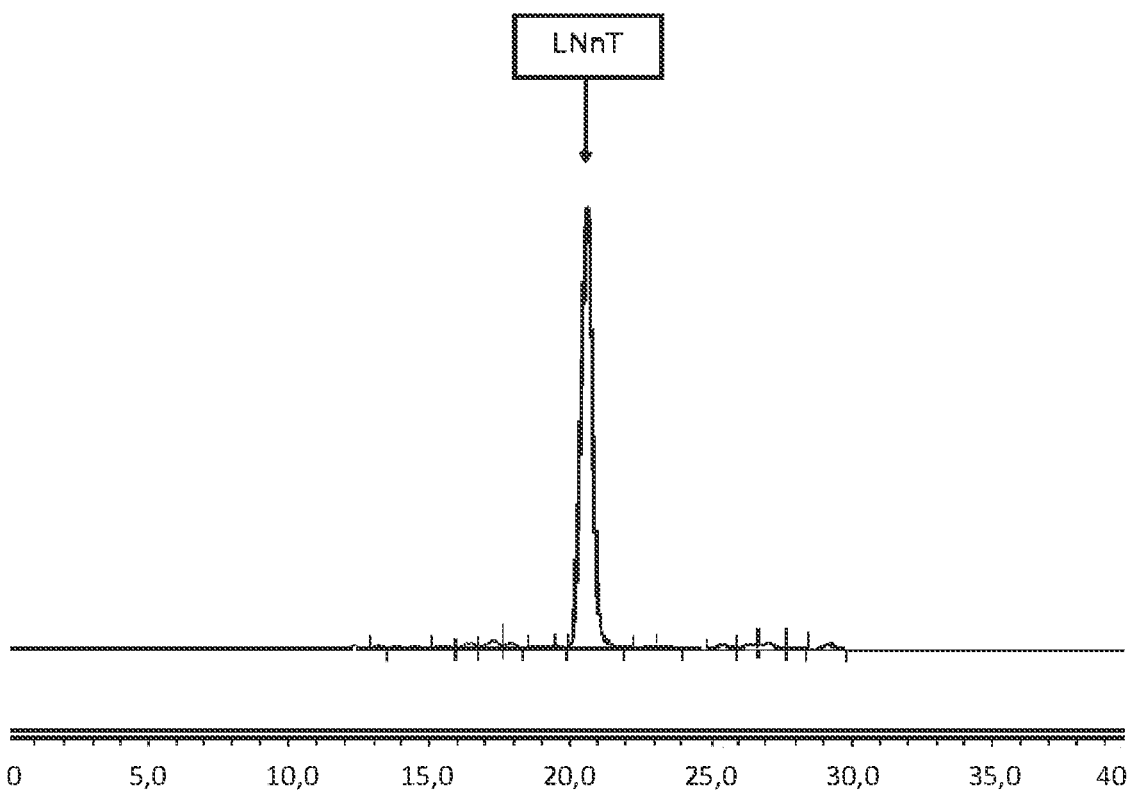
FIG. 27 shows a HILIC-CAD (Hydrophilic interaction liquid chromatography coupled to a charged aerosol detector) spectrum of the homogenized LNnT product obtained in example 20.

It is provided a simple, cost effective and scalable process for obtaining a purified lacto-N-neotetraose obtained from a microbial fermentation process, as a main product, whereas by-products, impurities and/or other contaminants such as lacto-N-triose II and/or glucosyllactose and/or galactosyllactose and/or para-lacto-N-neohexaose and/or para-lacto-N-neooctaose are separated from such main product.

The present invention provides a process for the purification of lacto-N-neotetraose (LNnT) in a batch manner or in a continuous manner, from a fermentation broth obtained by a microbial fermentation process, wherein a purified LNnT with a purity of more than 80%, more than 85%, more than 90% and/or more than 95% is provided. The fermentation broth contains the neutral HMO, biomass, medium components, contaminants and carbohydrates other than LNnT. The purity of LNnT in the fermentation broth is ≤60%.

The inventive process of the present application uses a fermentation broth comprising LNnT and other contaminants such as trioses, hexaose and/or tetraose among others, as a starting material, such fermentation broth is obtained from a microbial fermentation process. The purity of the LNnT in the fermentation broth is ≤60%. The fermentation broth is subjected to the following purification steps:

1) at least one membrane filtration step of a solution, the solution being a fermentation broth, the fermentation broth containing a mixture of carbohydrates obtained from the microbial fermentation process and after having run the standard downstream protocol is subjected to nanofiltration to significantly reduce the content of higher saccharides such as pentaoses and/or hexaoses to less than 10% and the purity of LNnT in the filtrated solution is of more than 60%, more than 65%, or more than 70%;

2) at least one SMB chromatography step, setting remaining amount of hexaose below 5% in order to make crystallization in the next step suitable, the purity of LNnT in the resulting purified solution is of more than 75% or more than 80%;

3) at least one crystallization step from water, obtaining a crystal mass which is processed and washed with alcohol, alcohol/water mixture or solvent or solvent/water mixture in order to wash off remaining smaller saccharides by draining and setting their concentration below 3%, obtaining a purity of LNnT in the resulting crystals of more than 85%, more than 90% or more than 95%;

4) at least one step of homogenization of the obtained, drained crystal mass, either by freeze drying, spray drying, drum/roller dying, vacuum drum/roller drying, band drying or vacuum band drying;

wherein a product containing a purified LNnT with a purity of ≥90% is provided.

Membrane filtration as a first step of the process of the present invention, is used in order to reduce the content of oligosaccharides with a higher molecular weight from the desired LNnT of smaller molecular weight. There are many different types of membranes that can be used for membrane filtration, but they all differ in their suitability for carbohydrates. The most common materials used for membranes are polymeric materials and ceramic membrane modules. While polymer-membranes can be processed as hollow fibers or as blocks due to their inherent flexibility, ceramic membranes are limited to be used as hollow fiber blocks. Both techniques can be combined in mixed-material-membranes or processed in succession, however industry mainly concentrates in the production of homogeneous materials due to cost and/or efficiency reasons.

In the case of the desired reduction of saccharides possessing a molecular weight greater than that of lacto-N-neotetraose, the step of membrane filtration, and more specifically, the step of nanofiltration is used. Nanofiltration is a pressure-driven membrane process that basically retains dissolved molecules, metal ions and other particles above the molecular weight cut-off (MWCO) limit. Membranes used in nanofiltration have a pore size of ≤2 nm, which distinguishes them from coarser membranes used in other membrane filtration methods such as ultrafiltration and microfiltration.

Compared to other membrane filtration steps, for example with reverse osmosis, nanofiltration uses correspondingly coarser membranes and lower working pressures. However, the membranes used for filtration are usually limited and/or strongly dependent in their retention properties and/or resistance to temperature impact or chemical exposure, so that the application of the method is essentially limited to the use of water and aqueous mixtures. lacto-N-neotetraose has a molecular weight of 707.6 Da and next larger saccharides extended by one or two monosaccharides, respectively, weigh 869.3 Da (LNnT+Glc/Gal), 910.3 Da (LNnT+GlcNAc), and 1072.4 Da (LNnT+LacNAc). Therefore, nanofiltration membranes offering the smallest possible MWCO are the membranes used in the present invention. The membranes used in the present invention have a MWCO between 0.2 and 3.5 kDa, more preferably between 0.2 and 2.0 kDa, and even more preferably between 0.2 and 1.0 kDa.

In order to obtain the reduction of higher saccharides than LNnT, or generally higher saccharides than a triose, a solution of a sugar mixture is set to a filtration process by applying pressure to a membrane. Three sugars are used for the separation: LNnT, a hexaose and a triose, which is also present as a by-product stemming from the microbial fermentation process in the fermentation broth mixture.

The objective of this first step of membrane filtration is in a first approach to deplete the hexaose so far that the sugar mixture accordingly contains relatively less hexaose to make the subsequent steps of SMB chromatography and crystallization as efficient as possible. Alternatively, this first step of membrane filtration can be used in a second approach to relatively deplete the tetraose and the hexaose content compared to the triose finally enriching LNnT and pLNnH in the retentate in order to be able to obtain purified LNnT after a subsequent SMB chromatography step and a subsequent crystallization step, in this way, first removing lower saccharides and then removing higher saccharides.

An aqueous solution of at least two, preferably three or more than three oligosaccharides, including LNnT, of which at least two differ in their mass and which all originate from a bacterial fermentation process and which already have been set to a process of purification up to the sugar component using microfiltration, ultrafiltration, anion and cation exchange, activated carbon treatment and filtration thereof, and/or diafiltration and electrodialysis (ED) is subjected to nanofiltration by applying 1-50 bar, more preferably 2-30 bar, more preferably 3-10 bar and more preferably 4-5 bar of pressure. The MWCO limit of the membrane is between 0.2 and 3.5 kDa, more preferably between 0.2 and 2.0 kDa, and more preferably between 0.2 and 1.0 kDa. A previously set sugar concentration of the solution is between 0.01 and 70% of dry solid content (DSC), more preferably between 0.1 and 60% DSC, more preferably between 1 and 50% DSC, and more preferably between 10 and 40% DSC. The dilution factor is between 0.01 and 1. Accordingly, the retentate must be rinsed with additional amounts of water depending on the dilution factor. DSC of the eluate therefore varies by a factor of 0.01 to 1. With the membrane filtration step the hexaose content is reduced below 20% in the retentate, more preferably below 15%, and more preferably below 10%.

The purity of the LNnT in the filtrated solution obtained from the membrane filtration step is of more than 60%, more than 65%, or more than 70%.

As an additional embodiment, separating off trioses from a mixture comprising as well trioses, as well as tetraoses as well as hexaoses, where these three types of saccharides may be main components of a sugar solution allows for further purification via a second membrane filtration step, in this case, nanofiltration, diminishing the hexaoses by choosing a membrane of suitable material and pore size and finally obtaining a purified LNnT solution.

As an additional embodiment, separating off hexaoses from a mixture comprising as well trioses, as well as tetraoses as well as hexaoses, where these three types of saccharides may be main components of a sugar solution allows for further purification via a second membrane filtration step, in this case, nanofiltration, diminishing remaining trioses by choosing a membrane of suitable material and pore size and finally obtaining a purified LNnT solution.

This filtrated solution is now subjected to a second step of simulated moving bed chromatography (SMB chromatography), which is used in order to adjust the content of a certain sugar containing fraction such as that of the hexaose compared to the fractions which contain tetraose by means of specially adapted parameters. The filtrated solution, which is the solution resulting from step 1 membrane filtration, has a content of hexaose below 20%, more preferably below 15%, and more preferably below 10%.

The step of SMB chromatography provides the second step of the present invention, for separating a mixture of HMO of which either extract or raffinate (either that of lower or that of higher saccharides) contains the tetrasaccharide lacto-N-neotetraose in a continuous chromatography (or in a continuous manner) from a filtrated solution comprising the neutral HMO-tetrasaccharide lacto-N-neotetraose and other byproduct contaminants wherein the filtrated solution comprises a mixture of lacto-N-neotetraose and contaminants comprises or consists of a solution which is derived from step 1, membrane filtration, and wherein the purity of the LNnT solution is less than 90%.

The filtrated solution is applied to at least one purification step using simulated moving bed chromatography. In this way, two solutions are to be obtained of which one comprises the desired lacto-N-neotetraose. After applying this step 2 of SMB chromatography, LNnT may mainly be present either in the extract or in the raffinate, either by having separated off lower oligosaccharides such as trioses or by having separated off higher saccharide such as hexaoses.

With this second step of simulated moving bed chromatography, it is provided an LNnT with higher purity and in a continuous manner. Thus, large amounts of high-quality HMOs may be provided in a very convenient and economical way. The SMB chromatography step is also highly stable even without a step of regeneration of the column material (e.g. cationic column material) used in this step. In a preferred embodiment, the purity of the LNnT in the filtrated solution is of more than 60%, more than 65%, or more than 70%. The term "filtrated solution" refers to a solution containing LNnT before the purification step of single moving bed chromatography and resulting from step 1, membrane filtration, whereas the "purified solution" refers to a solution after the step of simulated moving bed chromatography.

The at least one simulated moving bed chromatography step 2, has:
 i) at least 4 columns, preferably at least 8 columns, more preferably at least 12 columns, wherein at least one column comprises a weak or strong cation exchange resin, preferably a cation exchange resin in the $H^+$-form, $Na^+$-form, $K^+$-form or $Ca^{2+}$-form; and/or
 ii) four zones 1, 11, 111 and IV with different flow rates; and/or
 iii) an eluent comprising or consisting of water, preferably ethanol and water, more preferably 5-15 vol.-% ethanol and 85-95 vol.-% water, most preferably 9-11 vol.-% ethanol and 89-91 vol.-% water, iv) an operating temperature of 15° to 60° C., preferably 20° to 55° C., more preferably 25° to 50° C.

Since the HMO to be purified is lacto-N-neotetraose, the at least one simulated moving bed chromatography step has:
i) four zones I, II, III and IV with different flow rates, wherein the flow rates are preferably: 22-32 ml/min in zone 1, 17-23 ml/min in zone II, 18-25 ml/min in zone III and/or 14-20 ml/min in zone IV; and/or
ii) a feed rate of 0.5-4 ml/min, preferably 2 ml/min; and/or
iii) an eluent flow rate of 6-12 m/min, preferably 8 ml/min; and/or
iv) a switching time of 14-20 min, preferably 16-18 min, more preferably 17 min.

Preferably, at least one of the columns comprises 0.1 to 5000 kg of cation exchange resin, preferably 0.2 to 500 kg of cationic exchange resin, more preferably 0.5 to 50 kg of cation exchange resin, most preferably 1.0 to 20 kg of cation exchange resin.

Importantly, scaling-up of the amount of cation exchange material, the flow rate in the different zones, the feed rate, the eluent flow rate and/or the switching time is possible. The scaling-up may be by a factor of 2, 3, 4, 5, 6, 7, 8, 9, 10, 20, 30, 40, 50, 60, 70, 80, 90, 100, 1000 or all possible scaling factors in between said values.

In the columns, a strong cation exchange resin may be used as stationary phase. Preferably, the cation exchange resin is a sulfonic acid resin, more preferably a Purolite® PCR833H (Purolite, Ratingen, Germany), Lewatit MDS 2368 and/or Lewatit MDS 1368 resin. If a cation ion exchange resin is employed in the columns, it may be regenerated with sulphuric acid. Sulphuric acid can be employed in the eluent, preferably at concentration of 10 mM sulphuric acid or less. The (strong) cation exchange resin may be present in $H^+$-form or in $Ca^{2+}$-form.

Operating temperatures above 60° C. are not preferred during simulated moving bed chromatography. It was found that especially in the presence of a strong cation ion exchange resin (in $H^+$-form or $Ca^{2+}$-form) as stationary phase, the applied neutral oligosaccharides were significantly destabilized i.e. depolymerized which was detrimental to the final yield of LNnT.

In an advantageous embodiment of the invention, the purified solution can be applied to at least one further purification step using simulating moving bed chromatography, wherein a purified solution comprising the neutral human milk oligosaccharide with a purity of >85%, preferably >90%; more preferably >93% is provided. In particular, the invention yields a HMO product free of recombinant DNA, and free of host strain proteins.

The further simulated moving bed chromatography has
i) at least 4 columns, preferably at least 8 columns, more preferably at least 12 columns, wherein at least one column comprises a weak or strong cation exchange resin, preferably a cation exchange resin in the $H^+$-form, in the $Na^+$-form, in the $K^+$. form or in the $Ca^{2+}$-form; and/or
ii) four zones I, II, III and IV with different flow rates, and/or
iii) an eluent comprising or consisting of water, preferably ethanol and water, more preferably 5-15 vol.-% ethanol and 85-95 vol.-% water, most preferably 9-11 vol.-% ethanol and 89-91 vol.-% water, wherein the eluent optionally further comprises sulphuric acid, preferably 510 mM sulphuric acid; more preferably 52-5 mM sulphuric acid, and/or
iv) an operating temperature of 15° to 60° C., preferably $20^0$ to 55° C., more preferably 25° to 50° C.

If the HMO to be purified is lacto-N-neotetraose, the further simulated moving bed chromatography step has
i) four zones I, II, III and IV with different flow rates, wherein the flow rates are preferably: 22-32 ml/min in zone 1, 18-23 ml/min in zone II, 19-25 ml/min in zone III and/or 15-20 ml/min in zone IV; and/or
ii) a feed rate of 1-4 ml/min, preferably 2 m/min; and/or
iii) an eluent flow rate of 6-12 ml/min, preferably 9 m/min; and/or
iv) a switching time of 16-22 min. preferably 18-20 min, more preferably 19 min.

Particularly, at least one of the columns contains 0.1 to 5000 kg of cation exchange resin, preferably 0.2 to 500 kg of cation exchange resin, more preferably 0.5 to 50 kg of cation exchange resin, most preferably 1.0 to 20 kg of cation exchange resin.

Importantly, scaling-up of the amount of cation exchange material, the flow rate in the different zones, the feed rate, the eluent flow rate and/or the switching time is possible. The scaling-up may be by a factor of 2, 3, 4, 5, 6, 7, 8, 9, 10, 20, 30, 40, 50, 60, 70, 80, 90, 100, 1000 or all possible scaling factors in between said values. After a purification step using simulated moving bed chromatography, the pH of the purified solution may be adjusted to pH 7, preferably by adding a base, more preferably by adding NaOH (e.g. 0.2 M NaOH).

The purity of the LNnT in the purified solution obtained from the simulated bed chromatography step is more than 75% or more than 80%.

This purified solution is now subjected to a third step of crystallization, which is used in order to obtain a highly purified LNnT. The purified solution resulting from step 2, SMB chromatography, has a content of hexaose below 20%, more preferably below 15%, and more preferably below 10%.

The Crystallization Step Includes
a) obtaining a mixture of at least two, more preferably at least three or more oligosaccharides, of which one is a trisaccharide or a lower saccharide than a random tetraose, one is lacto-N-neotetraose and one is para-lacto-N-neohexaose or a higher oligosaccharide than a random tetraose of the mentioned oligosaccharides, after steps 1 and 2 it is obtained a purified solution of oligosaccharides of which lacto-N-neotetraose is one, preferably at a concentration of at least about 10% DSC, especially at least about 30% DSC, particularly at least about 50% DSC and LNnT purity of this mixture of at least 15%, preferably at least about 25%, especially at least about 40%, particularly at least about 60%,
b) crystallizing the mixture of said oligosaccharides from a starting temperature of at least 20-30° C., preferably at least about 30-40° C., preferably at least about 40-50° C., and more preferably at least about 50-60° C. and letting the saturated mass crystallize by cooling down to at least 40-50° C., preferably at least about 30-40° C., preferably at least about 20-30° C., preferably at least about 10-20° C., and more preferably at least about 0-10° C. in order to obtain a homogeneous crystal mass,
c) treating the obtained crystal mass rigorously with a mixture of an alcohol solvent such as methanol, ethanol or isopropanol or glycol or glycerol or any other mater-miscible alcohol or solvent and water, wherein the alcohol or solvent content of the solution is between 10 and 90 vol %, preferably between 30 and 80 vol % and more preferably between 50 and 70 vol %, to produce a mixture of the alcohol or solvent-containing solution and the crystal mass, d) filtering off the alcohol or solvent-containing and now sugar-containing fraction of the crystal mass in order reduce the content of lower saccharides from the crystal mass, preferably the process of washing can be repeated at least two times in order to reduce content of lower saccharides below a certain limit which is less than 10%, preferably less than 5% and the more preferably less than 3% before said crystal mass is subjected to a fourth step of homogenization.

The amount of alcohol or solvent used for crystal mass washing is not critical, but at least about 40-100 L, preferably about 30-70 L of alcohol or solvent are used per 10 kilogram of the crystal mass. Preferably, the alcohol or solvent solution is then filtered off, to remove smaller oligosaccharide by-products. The alcohol or solvent solution, after filtration and now containing less lacto-N-neotetraose can be used in another cycle of crystallization if needed, to provide more lacto-N-neotetraose. However, not only lacto-N-neotetraose can be purified on this way but also trisaccharides stemming from said fermentation broth or chemical synthesis or biocatalysis as well as higher saccharides such as pentoses, hexaoses as well as octaoses can be purified by washing of lower oligosaccharides with alcohol or solvent containing aqueous mixtures from their crystallization masses.

The purity of the LNnT in the crystals obtained from the crystallization step is of more than 85%, more than 90% and more than 95%.

The crystals are now subjected to a fourth step of homogenization, which is used in order to obtain a highly homogeneous and purified LNnT product with no more than 20% residual water content.

With the homogenization of the crystals it is obtained dry lacto-N-neotetraose from a raw crystal mass. Generally by using drying a mass transfer process consisting of the removal of water or another solvent by evaporation from a solid, semi-solid or liquid is undergone. This process is often used as a final production step. A source of heat and an agent to remove the vapor produced by the process are often involved. In bioproducts like food, grains, and pharmaceuticals like vaccines, the solvent to be removed is almost invariably water. Desiccation may be synonymous with drying or considered an extreme form of drying.

In the most common case, a gas stream, e.g., air, applies the heat by convection and carries away the vapor as humidity. Other possibilities are vacuum drying, where heat is supplied by conduction or radiation (or microwaves), while the vapor thus produced is removed by the vacuum system. Another indirect technique is drum drying, where a heated surface is used to provide the energy, and aspirators draw the vapor outside the room.

In the present case of crystallized lacto-N-neotetraose several methods can be used in order to provide a homogenized dried material of suitable product specificities. One of the most common methods used is oven drying or vacuum oven drying. However, in the case of a raw crystal mass oven drying or vacuum oven drying can only provide a homogeneous material by a combination of drying and mixing. The drained crystal mass obtained from the crystallization purification step must therefore be distributed neatly on a surface to obtain a maximum surface, from which then the solvent can evaporate during the process. When applying a step of oven drying, the temperature is set between 20 and 200° C., preferably between 25 and 100° C. or even more preferably between 30 and 50° C. in order to make the solvents evaporate. Solvents are removed by an air stream. When applying vacuum oven drying, the temperature is set between 20 and 200° C., preferably between 25 and 100° C. or even more preferably between 30 and 50° C. in order to make the solvents evaporate. Solvents are removed by a pump set to a vacuum in a range from 0.01-1000 mbar, preferably from 0.1-100 mbar or and more preferably between 1-10 mbar. Drying is run in both cases from 1 h to 7 days. Before or after drying the material is mixed.

In a second embodiment, final homogenization is not necessary as drying of the material is performed by applying oven drying or vacuum oven drying after a second cycle of crystallization which is run after a first crystallization and subsequent drying process. As here, is a second and third cycle of crystallization, no washing process is needed, no inhomogeneous material is formed. Generally, in a second and third crystallization cycle, crystals grow better due to an obtained higher purity and therefore said crystals are more easily dried after additional crystallization steps.

In a third embodiment, the homogenization method is freeze-drying. In this method, crystals obtained after draining of the crystallization mass, are dissolved in water before being subjected to a freeze drying process. Therefore, LNnT crystals are dissolved in water at a concentration ranging from 0.1-70% DCS, preferably from 1-50% DSC and more preferably from 5-25% DSC, before being frozen and being subjected to a freeze drying apparatus, which subtracts water and releases a foamy to gel-type dry and homogeneous sugar product.

Ideally, applying freeze-drying, in contrast to most other drying methods, results in a completely anhydrous or substantially water free product, which indirectly allows determination of the water content of a sample. Particularly with carbohydrates such as HMO of which the LNnT used is one, the determination of the residual water is difficult because first, they are poorly soluble in anhydrous solvents and second, alcohol-functionalities (OH-groups) have similar to the same spectroscopic properties as water.

As a fourth embodiment, the homogenization method is spray-drying. A spray dryer takes a liquid stream and separates the solution or suspension as a solid and the solvent into a vapor. The solid is usually collected in a drum or cyclone. The liquid input stream is sprayed through a nozzle into a hot vapor stream and vaporized. A nozzle is usually used to make the droplets as small as possible, maximizing heat transfer and the rate of water vaporization. Spray dryers can dry a product very quickly compared to other methods of drying. They also turn a solution, or slurry into a dried and homogenized powder in a single step.

Spray drying is preferably applied by setting the concentration of the sugar solution between 1 and 70% DSC, preferably between 10 and 60% DSC, preferably between 20 and 50% DSC, and more preferably between 30 and 40% DSC. The sugar-containing solution is then passed under pressure through the spray dryer nozzles with an inlet temperature set between 100 and 160° C., preferably between 110 and 150° C., and more preferably between 120 and 140° C. The flow is adjusted to maintaining an outlet temperature between 50-80° C., preferably between 60-70° C., more preferably between 66° C. to 67° C. Using these settings a homogeneous spray dried powder can be obtained.

As a fifth embodiment, the homogenizing method for obtaining lacto-N-neotetraose is roller or drum drying or vacuum roller drying. Roller drying or drum drying is a method used for drying out liquids from raw inhomogeneous materials. In the drying process, raw ingredients are dried at relatively low temperatures over rotating, high-capacity rolls that produce sheets of dried and homogeneous product. Drum drying techniques result in dried materials which reconstitute immediately and retain much of their original flavor, color and nutritional value. Some advantages of roller drying include the ability to dry viscous inhomogeneous solutions which cannot be easily dried with other methods and drum dryers can be cleaned easily and are easy to operate and maintain.

When roller drying is applied, temperature of the rolls is set between 20 and 200° C., preferably between 50 and 150° C., and more preferably between 75 and 125° C. in order for the solvents to evaporate. Solvents are removed by an air stream. When applying vacuum roller drying, temperature is set between 20 and 200° C., more specifically between 50 and 150° C. or even more specifically between 75 and 125° C. in order to make the solvents evaporate. Solvents are removed by a pump set to a vacuum in a range of 0.1-1000 mbar, preferably of 1-500 mbar and more preferably 10-100 mbar. In both cases rolls rotate from 0.1-100 turns/min, preferably from 1-10 turns/min.

As a sixth embodiment, the homogenization method for obtaining lacto-N-neotetraose is band or vacuum band drying. Band or vacuum band drying is a method used for drying out liquids from raw materials. In the drying process, raw ingredients are dried at relatively low temperatures over moving, high-capacity bands that produce dried homogeneous product.

The final powder product has a purity of LNnT in the purified preparation of ≥80%, preferably of ≥85%, more preferably of ≥90%, with respect to the dry matter of the purified preparation.

The present invention is described with respect to particular embodiments and with reference to drawings, but the invention is not limited thereto but only by the claims. Furthermore, the terms first, second and the like in the description and in the claims, are used for distinguishing between similar elements and not necessarily for describing a sequence, either temporally, spatially, in ranking or in any other manner.

It is to be understood that the terms so used are interchangeable under appropriate circumstances and that the embodiments of the invention described herein are capable of operation in other sequences than described or illustrated herein. It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description and drawings provided herein, numerous specific details are set forth. However, it is understood that embodiments of the invention may be practiced without these specific details. In other instances, well-known methods, structures and techniques have not been shown in detail in order not to obscure an understanding of this description.

The invention is described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

Example 1: Nanofiltration of a LNnT-Containing Carbohydrate Mixture of 80 L Volume Containing Two Major by-Products to Separate Off, Thereby Achieving a Depletion of Higher Saccharides Such as pLNnH and an Accumulation of Smaller Saccharides Such as Trioses and LNnT 80 L of an aqueous solution of a sugar mixture are subjected to a 200 Da nanofiltration to deplete the pLNnH. The dry solid content (DSC) of the sugar solution is 5.51% and the ratio of the 3 considered sugars is given as: 4.0% triose, 62.0% LNnT and 20.8% pLNnH. This corresponds the equivalent of a total sugar amount of 4.41 kg and a LNnT amount of 2.73 kg. Using the feed pump, the sugar mixture is fed at a pressure of about 4 bar into the circulation of the filtration plant. With a circulation pump, the sugar solution is pumped in a circle at a pressure of 5 bar around the 200 Da ceramic membrane to be filtered through. On the permeate side, the filtered sugar solution leaves the membrane at a pressure of one bar. After consecutive filtration of 20 liters each, the retentate and permeate are analyzed for sugar composition and sugar concentration.

After 20 liters, the retentate changes as follows. The 60 L retentate now are characterized by 6.85% DSC being composed of 3.9% triose, 61.7% LNnT, and 22.3% pLNnH. This corresponds to the equivalent of a total sugar amount of 4.11 kg and a LNnT amount of 2.54 kg. The permeate has the following composition: 1.88% DSC at a composition of 4.5% triose, 67.2% LNnT and 11.7% pLNnH. This corresponds to a total of 380 g sugar and a LNnT amount of 253 g.

After further 20 liters, the retentate changes as follows. The remaining 40 L retentate now a characterized by a dry mass of 9.95% DSC with a composition of 3.9% triose, 62.5% LNnT and 24.6% pLNnH. This corresponds to a total sugar quantity of 3.98 kg and a LNnT quantity of 2.49 kg. The 20 L permeate have the following composition: 2.44% DSC with a composition of 4.6% triose, 67.5% LNnT and 12.1% pLNnH. The equivalent of a total amount of sugar of 490 g and a LNnT amount of 329 g.

These results allow to calculate permeation factors for each sugar component. The triose is permeated by a factor of about 1.15, LNnT by a factor of 1.09 and pLNnH by a factor of 0.55.

Results are shown in Table 1, Table 2 and Table 3.

TABLE 1

Retentate analysis

| Volume retentate [L] | DSC retentate [%] | m retentate [kg] | Triose content [%] | LNnT content [%] | pLNnH content [%] | m LNnT [kg] |
|---|---|---|---|---|---|---|
| 80 | 5.51 | 4.41 | 4.0 | 62.0 | 20.8 | 2.73 |
| 60 | 6.85 | 4.11 | 3.9 | 61.7 | 22.3 | 2.54 |
| 40 | 9.95 | 3.98 | 3.9 | 62.5 | 24.6 | 2.49 |

TABLE 2

Permeate analysis

| Volume permeate [L] | DSC permeate [%] | m permeate [g] | Triose content [%] | LNnT content [%] | pLNnH content [%] | m LNnT [g] |
|---|---|---|---|---|---|---|
| 1.20 | 1.88 | 380 | 4.5 | 67.2 | 11.7 | 253 |
| 2.20 | 2.44 | 490 | 4.6 | 67.5 | 12.1 | 329 |

TABLE 3

Permeation factor determination

| Volume retentate [L] | Volume permeate [L] | Triose permeation factor | LNnT permeation factor | pLNnH permeation factor |
|---|---|---|---|---|
| 80 | | | | |
| 60 | 1.20 | 1.13 | 1.08 | 0.56 |
| 40 | 2.20 | 1.18 | 1.09 | 0.54 |

Example 2: Nanofiltration of a LNnT-Containing Carbohydrate Mixture of 35 L Volume Containing Two Major by-Products to Separate Off and Intermediate Addition of Another 10 L of Water to the Feed Solution Achieving a Depletion of Higher Saccharides Such as pLNnH and an Accumulation of Smaller Saccharides Such as Trioses and LNnT 35 L of an aqueous solution of a sugar mixture are subjected to a 200 Da nanofiltration to deplete the pLNnH. The dry solid content (DSC) of the sugar solution is 7.88% and the ratio of the 3 considered sugars is given as: 2.8% triose, 58.0% LNnT and 26.1% pLNnH. This corresponds the equivalent of a total sugar amount of 2.76 kg and a LNnT amount of 1.60 kg. Using the feed pump, the sugar mixture is fed at a pressure of about 4 bar into the circulation of the filtration plant. With a circulation pump, the sugar solution is pumped in a circle at a pressure of 5 bar around the 200 Da ceramic membrane to be filtered through. On the permeate side, the filtered sugar solution leaves the membrane at a pressure of one bar. The sugar solution is pumped through the membrane in increments of 5 L and the remaining retentate and the resulting permeate are analyzed for sugar composition and sugar concentration. After the first 10 L, 5 L of fresh water are added twice to the feed.

After the first 5 liters, the retentate changes as follows. The 30 L retentate now are characterized by 8.34% DSC being composed of 2.2% triose, 57.5% LNnT, and 26.1% pLNnH. This corresponds to the equivalent of a total sugar amount of 2.50 kg and a LNnT amount of 1.44 kg. The permeate has the following composition: 2.37% DSC at a composition of 3.5% triose, 59.6% LNnT and 16.5% pLNnH. This corresponds to a total of 120 g sugar and a LNnT amount of 71 g.

After further 5 L, the retentate changes as follows. The remaining 25 L retentate now a characterized by a dry mass of 9.07% DSC with a composition of 2.3% triose, 57.1% LNnT and 26.9% pLNnH. This corresponds to a total sugar quantity of 2.27 kg in the retentate and a LNnT quantity of 1.30 kg. The combined 10 L permeate have the following composition: 2.21% DSC with a composition of 3.5% triose, 61.1% LNnT and 16.3% pLNnH. The equivalent of a total amount of sugar of 220 g and a LNnT amount of 135 g.

At this point 5 L of water are added to the feed prior to further filtration. After further 5 L, the retentate changes as follows. The remaining 25 L retentate now a characterized by a dry mass of 8.95% DSC with a composition of 2.2% triose, 56.1% LNnT and 26.3% pLNnH. This corresponds to a total sugar quantity of 2.24 kg in the retentate and a LNnT quantity of 1.26 kg. The combined 15 L permeate have the following composition: 2.24% DSC with a composition of 3.6% triose, 60.4% LNnT and 16.6% pLNnH. The equivalent of a total amount of sugar of 340 g and a LNnT amount of 203 g.

At this point another 5 L of water are added to the feed prior to further filtration. After further 5 L, the retentate changes as follows. The remaining 25 L retentate now a characterized by a dry mass of 7.86% DSC with a composition of 2.2% triose, 56.3% LNnT and 26.9% pLNnH. This corresponds to a total sugar quantity of 1.97 kg in the retentate and a LNnT quantity of 1.11 kg. The combined 20 L permeate have the following composition: 1.94% DSC with a composition of 3.4% triose, 61.3% LNnT and 16.5% pLNnH. The equivalent of a total amount of sugar of 390 g and a LNnT amount of 238 g.

After further 5 L, the retentate changes as follows. The remaining 20 L retentate now a characterized by a dry mass of 8.15% DSC with a composition of 2.2% triose, 56.4% LNnT and 27.4% pLNnH. This corresponds to a total sugar quantity of 1.63 kg in the retentate and a LNnT quantity of 919 g. The combined 25 L permeate have the following composition: 1.94% DSC with a composition of 3.4% triose, 61.9% LNnT and 17.5% pLNnH. The equivalent of a total amount of sugar of 490 g and a LNnT amount of 300 g.

After the last 5 L, the combined 30 L permeate have the following composition: 2.51% DSC with a composition of 3.5% triose, 59.7% LNnT and 16.5% pLNnH. The equivalent of a total amount of sugar of 750 g and a LNnT amount of 450 g.

These results lead to permeation factors for each sugar component. The triose is permeated by a factor of about 1.55, LNnT by a factor of 1.05 and pLNnH by a factor of 0.62.

Results are shown in Table 4, Table 5 and Table 6.

TABLE 4

Retentate analysis

| Volume retentate [L] | DSC retentate [%] | m retentate [kg] | Triose content [%] | LNnT content [%] | pLNnH content [%] | m LNnT [kg] |
|---|---|---|---|---|---|---|
| 35 | 7.88 | 2.76 | 2.3 | 58.0 | 26.1 | 1.60 |
| 30 | 8.34 | 2.50 | 2.2 | 57.5 | 25.7 | 1.44 |
| 25 | 9.07 | 2.27 | 2.3 | 57.1 | 26.9 | 1.30 |
| 20 + 5 | 8.95 | 2.24 | 2.2 | 56.1 | 26.3 | 1.26 |
| 20 + 5 | 7.86 | 1.97 | 2.2 | 56.3 | 26.9 | 1.11 |
| 20 | 8.15 | 1.63 | 2.2 | 56.4 | 27.4 | 0.92 |

TABLE 5

Permeate analysis

| Volume permeate [L] | DSC permeate [%] | m permeate [g] | Triose content [%] | LNnT content [%] | pLNnH content [%] | m LNnT [g] |
|---|---|---|---|---|---|---|
| 5 | 2.37 | 120 | 3.5 | 59.6 | 16.5 | 71 |
| 10 | 2.21 | 220 | 3.5 | 61.1 | 16.3 | 135 |
| 15 | 2.24 | 340 | 3.6 | 60.4 | 16.6 | 203 |
| 20 | 1.94 | 390 | 3.4 | 61.3 | 16.5 | 238 |
| 25 | 1.94 | 490 | 3.4 | 61.9 | 17.0 | 300 |
| 30 | 2.51 | 750 | 3.5 | 59.7 | 16.5 | 450 |

TABLE 6

Permeation factor determination

| Volume retentate [L] | Volume permeate [L] | Triose permeation factor | LNnT permeation factor | pLNnH permeation factor |
|---|---|---|---|---|
| 35 | 0 | | | |
| 30 | 5 | 1.52 | 1.03 | 0.63 |
| 25 | 10 | 1.59 | 1.06 | 0.63 |
| 20 + 5 | 15 | 1.57 | 1.06 | 0.62 |
| 20 + 5 | 20 | 1.55 | 1.09 | 0.63 |
| 20 | 25 | 1.55 | 1.10 | 0.63 |
| 15 | 30 | 1.59 | 1.06 | 0.60 |

Example 3: Simulated Moving Bed Chromatography of a LNnT-Containing Carbohydrate Mixture which Contains Two Major by-Products to Separate Achieving a Depletion of Higher Saccharides Such as pLNnH Below 3% and an Accumulation of Smaller Saccharides Such as Trioses and LNnT For SMB purification, a clear, particle-free solution comprising said 3 oligosaccharides was concentrated to about 300 g/L employing a vacuum concentrator at 45° C. For the SMB chromatography, a close loop multicomponent SMB System equipped with 12 columns (Prosep® columns with the dimensions: 40 mm×740 mm (Latek, Eppelheim, Germany)) arranged in 2×4 zones was employed. Each column contained 760 g of Purolite® PCR833H+ (Purolite, Ratingen, Germany) strong cation ion exchanger resin.

The system was operated at 25° C. with the following set flow parameters: flow rate zone I was 30.00 ml/min, flow rate zone II was set to 21.00 ml/min, flow rate of zone III was set to 21.48 ml/min, flow rate of zone IV was set to 18.44 m/min, feed was set to 3.00 ml/min, eluent flow was set to 11.56 ml/min and switching time was set to 17.92 min. As eluent, water with 10% (v/v) food grade ethanol was used. Saccharides smaller than pentaoses such as trioses and LNnT such as smaller hydrolysis products such as lactose, lacto-N-biose, glucose, galactose and N-acetyl galactosamine were mainly fractioned into the extract. Higher oligosaccharides, more precisely saccharides bigger than tetraoses such as pentaose, hexaoses such as pLNnH, as well as bigger oligosaccharides such as heptaoses or octaoses as well as residual salt contaminations stemming from the eluent or resin loading were fractioned into the raffinate. At the described settings the SMB system could be continuously operated for at least 3 months.

Using this protocol LNnT purity could be significantly increased. In this first example, LNnT with the following specifications was used: 12.7% DSC with a composition of 3.5% triose, 59.7% LNnT and 16.5% pLNnH. After SMB chromatography the extract had the following constitution: 4.9% triose, 70.4% LNnT and 2.2% pLNnH. The raffinate, in turn, had the following constitution: 0.7% triose, 1.1% LNnT and 59.5% pLNnH. The yield of the purification was approximately 80%.

Results are shown in Table 7.

TABLE 7

SMB results from Example 3

| | Triose content [%] | LNnT content [%] | pLNnH content [%] |
|---|---|---|---|
| Feed | 3.5 | 59.7 | 16.5 |
| Extract | 4.9 | 70.4 | 2.2 |
| Raffinate | 0.7 | 1.1 | 59.5 |

Example 4: Simulated Moving Bed Chromatography of a LNnT-Containing Carbohydrate Mixture which Contains Two Major by-Products to Separate Achieving a Depletion of Higher Saccharides Such as pLNnH Below 3% and an Accumulation of Smaller Saccharides Such as Trioses and LNnT For SMB purification, a clear, particle-free solution comprising said 3 oligosaccharides was concentrated to about 300 g/L employing a vacuum concentrator at 45° C. For the SMB chromatography, a close loop multicomponent SMB System equipped with 12 columns (Prosep® columns with the dimensions: 40 mm×740 mm (Latek, Eppelheim, Germany)) arranged in 2×4 zones was employed. Each column contained 760 g of Purolite® PCR833H+ (Purolite, Ratingen, Germany) strong cation ion exchanger resin.

The system was operated at 25° C. with the following set flow parameters: flow rate zone I was 30.00 ml/min, flow rate zone II was set to 21.00 ml/min, flow rate of zone III was set to 21.48 ml/min, flow rate of zone IV was set to 18.44 ml/min, feed was set to 3.00 ml/min, eluent flow was set to 11.56 ml/min and switching time was set to 17.92 min. As eluent, water with 10% (v/v) food grade ethanol was used. Saccharides smaller than pentaoses such as trioses and LNnT such as smaller hydrolysis products such as lactose, lacto-N-biose, glucose, galactose and N-acetyl galactosamine were mainly fractioned into the extract. Higher oligosaccharides, more precisely saccharides bigger than tetraoses such as pentaose, hexaoses such as pLNnH, as well as bigger oligosaccharides such as heptaoses or octaoses as well as residual salt contaminations stemming from the eluent or resin loading were fractioned into the raffinate. At the described settings the SMB systems could be continuously operated for at least 3 months.

Using this protocol LNnT purity could be significantly increased. In this second example, LNnT with the following specifications was used: 3.7% triose, 67.6% LNnT and 15.4% pLNnH. After SMB chromatography the extract had the following constitution: 4.3% triose, 80.3% LNnT and 0.6% pLNnH. The raffinate, in turn, had the following constitution: 5.3% triose, 2.1% LNnT and 47.9% pLNnH. The yield of the purification was approximately 80%.

Results are shown in Table 8.

TABLE 8

| SMB results from example 4 | | | |
|---|---|---|---|
|  | Triose content [%] | LNnT content [%] | pLNnH content [%] |
| Feed | 3.7 | 67.6 | 15.4 |
| Extract | 4.3 | 80.3 | 0.6 |
| Raffinate | 5.3 | 2.1 | 47.9 |

Example 5: Crystallization of a LNnT-Containing Carbohydrate Mixture which Contains One Major by-Product to Separate Achieving a Depletion of Lower Saccharides Such as Trioses Below 3%

385.3 g of a carbohydrate mixture with the following constitution were subjected to a crystallization process. Triose: 4.9%, LNnT: 70.4%, pLNnH: 2.2%. The material was dissolved in roundabout 0.4 L deionized water before its DSC was set to 70% by using a rotary evaporator at reduced pressure. Said carbohydrate mixture was removed from the rotary evaporator before it was stored in an environment that ensures a slow cooling rate of roundabout 10°/h. Thereby a solid layer started to form on the surface of the mixture finally resulting in a completely crystalline mass after 3 days. After complete crystallization said crystal mass was rigorously mixed with two parts of 70 vol. % ethanolic solution (70 vol. % EtOH/30 vol. % H2O) finally removing the resulting washing solution under reduced pressure by using a funnel frit filter. Said washing process was repeated twice resulting in a drained and purified LNnT crystal mass which was dried in a vacuum oven at 3 mbar and 35° C. The yield of the crystallization was determined as 228.0 g (59.2%); the compounds constitution was determined as: Triose content: 0.5%, LNnT content: 94.4%, pLNnH content: 1.2%. However, when considering LNnT purity of the starting material as well as of the crystalline product, yield increases to 79.3% ((94.4%*228 g)/(70.4%*385.3 g)).

Results are shown in Table 9:

TABLE 9

| Crystallization results | | | | | |
|---|---|---|---|---|---|
|  | Mass [g] | Triose content [%] | LNnT content [%] | pLNnH content [%] | m (LNnT) [g] |
| Starting material | 385.3 | 4.9 | 70.4 | 2.2 | 385.3 |
| Product | 228.0 | 0.5 | 94.4 | 1.2 | 215.2 |

Example 6: Crystallization of a LNnT-Containing Carbohydrate Mixture which Contains One Major by-Product to Separate Achieving a Depletion of Lower Saccharides Such as Trioses Below 3%

462.3 g of a carbohydrate mixture with the following constitution were sent to a crystallization process. Triose: 4.3%, LNnT: 80.3%, pLNnH: 0.6%. Its LNnT quantity was determined as 371.1 g. The material was dissolved in roundabout 0.5 L deionized water before its DSC was adjusted to 69% by using a rotary evaporator at reduced pressure. Said carbohydrate mixture was removed from the rotary evaporator before it was stored in an environment that ensures a slow cooling rate of roundabout 10°/h. Thereby a solid layer started growing on the surface of the mixture finally resulting in a completely crystalline mass after 2 days. After complete crystallization said crystal mass was rigorously mixed with two parts of 70 vol. % ethanolic solution (70 vol. % EtOH/30 vol. % H2O) finally removing the resulting washing solution under reduced pressure by using a funnel frit filter. Said washing process was repeated resulting in a drained and purified LNnT crystal mass which was dried in a vacuum oven at 3 mbar and 35° C. The yield of the crystallization was determined as 244.0 g (52.8%), the compounds constitution was determined as: Triose content: 6.6%, LNnT content: 89.7%, pLNnH content: <0.5%. Here, purification via crystallization was not successful. However, said product was used in another crystallization.

244.0 g of a carbohydrate mixture were sent to a crystallization process. The LNnT quantity was determined as 218.9 g. The material was dissolved in roundabout 0.25 L deionized water before its DSC was set to 70% by using a rotary evaporator at reduced pressure. Said carbohydrate mixture was removed from the rotary evaporator before it was stored in an environment that ensures a slow cooling rate of roundabout 10°/h. Thereby a solid layer started growing on the surface of the mixture finally resulting in a completely crystalline mass after 5 days. After complete crystallization said crystal mass was rigorously mixed with two parts of 70 vol. % ethanolic solution finally removing the resulting washing solution under reduced pressure by using a funnel frit filter. Said washing process was repeated twice resulting in a drained and purified LNnT crystal mass which was dried in a vacuum oven at 3 mbar and 35° C. The yield of the crystallization was determined as 204.6 g (83.9%); the compounds constitution was determined as: Triose content: 0.7%, LNnT content: 97.4%, pLNnH content: 0.2%. When considering LNnT purity of the starting material as well as of the crystalline product, yield increases to 91.1% ((97.4%*204.6 g)/(89.7%*244.0 g)).

Results are shown in Table 10:

TABLE 10

Crystallization results

| | Mass [g] | Triose content [%] | LNnT content [%] | pLNnH content [%] | m (LNnT) [g] |
|---|---|---|---|---|---|
| Starting material | 462.1 | 4.3 | 80.3 | 0.6 | 371.2 |
| Intermediate Product | 244.0 | 6.6 | 89.7 | <0.5 | 218.9 |
| Product | 204.6 | 0.7 | 97.4 | 0.2 | 199.3 |

Example 7: Crystallization of a pLNnH-Containing Carbohydrate Mixture which Contains One Major by-Product to Separate Achieving a Depletion of Lower Saccharides Such as LNnT Below 4%

Roundabout 250 g of a carbohydrate mixture with the following constitution was subjected to a crystallization process. Triose: <0.5%, LNnT: 2.1%, pLNnH: 47.9%. Remaining solids are substantially composed of residual salts. The material was dissolved in roundabout 0.5 L deionized water before its DSC was set to 55% by using a rotary evaporator at reduced pressure. Said carbohydrate mixture was removed from the rotary evaporator before it was stored in an environment that ensures a slow cooling rate of roundabout 10°/h. Thereby a solid layer started to form on the surface of the mixture finally resulting in a completely crystalline mass after 5 days. After complete crystallization 50 g of the crude said crystal mass were rigorously mixed with two parts of 70 vol. % ethanolic solution (70 vol. % EtOH/30 vol. % H2O) finally removing the resulting washing solution under reduced pressure by using a funnel frit filter. Said washing process was repeated twice resulting in a drained and purified pLNnH crystal mass which was dried in a vacuum oven at 3 mbar and 35° C. The yield of the crystallization was determined 13.0 g (26.0%); the compounds constitution was determined as: Triose content: 0%, LNnT content: 3.75%, pLNnH content: 80.6%. However, when considering pLNnH purity of the starting material as well as of the crystalline product, yield increases to 58.3% ((80.6%*13.0 g)/(0.75*47.9%*50 g)) considering a humidity of the drained crystal mass of 25%.

Example 8: Preparation of Seed Crystals of LNnT from Deionized Water

A 56% LNnT mixture yielded from a fermentative process was purified via repetitive gel filtration steps with pure water as solvent (Biorad Bio-Gel® P-2, fine) finally yielding LNnT seed crystals after volume reduction by using a rotary evaporator. 10.0 g of the spray-dried starting material were diluted to a 50% DSC with pure water and filtrated three times. At every filtration step, predominantly LNnT containing fractions were combined, reconcentrated in vacuo and diluted again to 50% DSC and sent to another round of gel-filtration. 2.8 g of gel-type material were obtained after concentration at reduced pressure which crystallized upon standing. The product was analyzed via HPAEC PAD chromatography; purity of the unwashed crystals was at 83.1% LNnT with 6.3% of unseparated triose as main byproduct.

Example 9: 200 g Crystallization of LNnT by Addition of NaCl

In order to prevent gel formation during the crystallization of LNnT, one mass percent of a food compatible salt, such as NaCl, is added to the solution. 200 g of LNnT (15.0% triose, 65.9% LNnT, 4.4% pLNnH; this equals 131.8 g of pure LNnT) and 2.0 g of NaCl are dissolved in 200 mL of water. The solution is then set to a DSC of 70%. Some seed crystals are added to the highly viscos slurry and LNnT is allowed to crystallize at room temperature for one day. After complete crystallization, the crystal mass is mixed with two parts of 80% vol. % ethanolic solution (80 vol. % EtOH/20 vol. % H2O) and centrifuged for 15 min at 6000 rpm. The sedimented carbohydrate mixture is suspended with another part of 80% vol. % ethanolic solution and centrifuged again. This process is repeated. After three cycles of centrifugation the sediment is freeze-dried. 163.6 g of LNnT are obtained after the first crystallization. The purity of the LNnT could be increased by around 11% from 65.9% to 76.5% (6.5% triose, 5.2% pLNnH) resulting in 125.1 g of pure LNnT (94.9% yield).

Example 10: 200 g 2nd Crystallization of LNnT 158.6 g of LNnT taken from Example 9 are crystallized. Therefore, starting material is dissolved in 159 mL of deionized water and concentrated to 70% DSC at reduced pressure. Seed crystals are added to the highly viscos slurry and LNnT is allowed to crystallize at room temperature for 1 day. After complete crystallization, the crystal mass is mixed with two parts of 80% vol. % ethanolic solution (80 vol. % EtOH/20 vol. % H2O) and centrifuged for 15 min at 6000 rpm. The sedimented carbohydrate mixture is suspended with another part of 80 vol. % ethanolic solution and centrifuged again. This process is repeated. After three cycles of centrifugation the sediment is freeze-dried. 115.2 g of LNnT are obtained after the second crystallization. The purity of the LNnT could be increased by around 6% from 76.5% to 82.4% (2.4% triose, 5.7% pLNnH) resulting in 94.9 g pure LNnT (78.2% yield).

Example 11: 100 g Crystallization of LNnT by Addition of NaCl 100 g of LNnT (15.0% triose, 65.9% LNnT, 4.4% pLNnH; equal to 131.8 g of pure LNnT) and 1.0 g of NaCl are dissolved in 100 ml of water and then concentrated under reduced pressure to a DSC of 70%. Seeding crystals were added to the highly viscos slurry and LNnT is allowed to crystallize at room temperature for 1 day. After complete crystallization, the crystal mass is mixed with two parts of 80% vol. % ethanolic solution (80 vol. % EtOH/20 vol. % H2O) and centrifuged for 15 min at 6000 rpm. The sedimented product is suspended with another volume ml of 80% EtOH and centrifuged again. This process is repeated. Afterwards the sediment is freeze-dried. 67.0 g of LNnT are obtained after the first crystallization. The purity of the material could be increased by around 15% from 65.9% to 81.7% (6.2% triose, 6.0% hexaose) resulting in 54.7 g of pure LNnT (83.1% yield).

Example 12: 100 g 2nd Crystallization of LNnT 50.0 g of LNnT taken from Example 11 are crystallized. Therefore, the starting material is dissolved in 100 ml of water and concentrated to 70% DSC at 60° C. Seed crystals are added to the highly viscos slurry and LNnT is allowed to crystallize at room temperature for 1 day. After complete crystallization, the crystal mass is mixed with two volumes of 80% vol. % ethanolic solution (80 vol. % EtOH/20 vol. % H2O) and centrifuged for 15 min at 6000 rpm. The sedimented carbohydrate mixture is twice suspended with another volume of 80% EtOH and centrifuged again. Then the sediment is freeze-dried. 36.0 g of LNnT are obtained after the second crystallization. The purity of the material could be increased by around 3% from 81.7% to 84.3% (2.9% triose, 6.4% hexaose) resulting in 30.3 g pure LNnT (74.3%).

Example 13: Homogenization of LNnT by Using Spray-Drying 228.0 g of LNnT with the following constitution were homogenized by spray-drying said product on a Büchi apparatus B-290: (0.5% triose, 94.4% LNnT, 1.2% pLNnH) Therefore, the material was dissolved in 1.5 L (15.2% DSC) of water, then sterile-filtered (45 mm pore-size) and spray-dried at 130° C. inlet and 66° C. outlet temperature. 178.0 g (78.1%) of a white homogeneous powder were obtained with a residual water content of 8.6% determined by Karl-Fischer titration. The purity of the material was determined as 0.4% triose, 94.4% LNnT and 1.1% pLNnH resulting in 168.0 g pure, homogeneously spray-dried LNnT.

Example 14: Homogenization of LNnT by Using Spray-Drying 204.0 g of LNnT with the following constitution were homogenized by spray-drying said product on a Büchi apparatus B-290: (0.7% triose, 97.4% LNnT, 0.2% pLNnH) Therefore, the material was dissolved in 1.2 L (14.6% DSC) of water, then sterile-filtered (45 mm pore-size) and spray-dried at 130° C. inlet and 66° C. outlet temperature. 129.0 g (63.2%) of a white homogeneous powder were obtained with a residual water content of 7.1% determined by Karl-Fischer titration. The purity of the material was determined as 0.3% triose, 96.3% LNnT and <0.25% pLNnH resulting in 124.2 g pure, homogeneously spray-dried LNnT.

Example 15: Homogenization of LNnT by Using Spray-Drying 110.7 g of LNnT with the following constitution were homogenized by spray-drying said product on a Büchi apparatus B-290: (2.4% triose, 82.4% LNnT, 5.7% pLNnH) Therefore, the material was dissolved in 300 ml (27% DSC) of water, then sterile-filtered (45 mm pore-size) and spray-dried at 130° C. inlet and 66° C. outlet temperature. 71.9 g (65.0%) of a white homogeneous powder were obtained, which showed approximately the same spectrum as the starting material from Example 10 as proof of spray drying compatibility of the obtained material.

Example 16: Drying of LNnT by Using Oven Drying 9.629 g of crystalline LNnT were oven-dried. After 7 days at 35° C. its weight diminished to 9.612 g what corresponds to 99.8%. Its LNnT purity was determined as 88.7% before and 88.2% after drying proving oven drying at 35° C. suitable.

Example 17: Drying of LNnT by Using Vacuum Oven Drying 10.307 g of crystalline LNnT were oven-dried. After 7 days at 35° C. its weight diminished to 10.219 g what corresponds to 99.8%. Its LNnT purity was determined as 88.7% before and 90.3% after drying proving oven drying at 35° C. suitable.

Example 18: Homogenization of LNnT by Using Freeze-Drying 10.265 g of crystalline LNnT were freeze-dried on a Christ BETA 2-8 LD plus apparatus. Therefore, said HMO was dissolved in roundabout 90 mL deionized water and freezed at −80° C. before being subjected to a freeze-drying process set to $2.0*10^{-3}$ mbar and cooled to −85° C. After 7 days weight diminished to 9.668 g what corresponds to 94.2%. Its LNnT purity was determined as 88.7% before and 90.2% after drying proving freeze-drying a suitable method for homogenization.

Example 19: Homogenization of LNnT by Using Freeze-Drying 15.404 g of crystalline LNnT were freeze-dried on a Christ BETA 2-8 LD plus apparatus. Therefore, said HMO was dissolved in roundabout 60 mL deionized water and freezed at −80° C. before being subjected to a freeze-drying process set to $2.0*10^{-3}$ mbar and cooled to −85° C. After 7 days weight diminished to 14.566 g what corresponds to 94.6%. Its LNnT purity was determined as 88.7% before and 89.5% after drying proving freeze-drying a suitable method for homogenization.

The invention claimed is:

1. A process for purification of LNnT (lacto-N-neotetraose) from a fermentation broth, wherein the process comprises:
   providing a fermentation broth which contains LNnT, biomass, medium components, contaminants and carbohydrates other than LNnT;
   subjecting the fermentation broth to at least one membrane filtration using nanofiltration membranes, thereby providing a filtrated solution containing LNnT;
   subjecting the filtrated solution to at least one simulated moving bed chromatography, thereby providing a purified solution which contains LNnT;
   subjecting the purified solution to at least one crystallization from water, thereby providing a crystal mass which contains LNnT
   wherein the crystallization comprises
      obtaining a mixture of at least two oligosaccharides, containing at least LNnT in a concentration of at least about 50% DSC and such LNnT purity of this mixture is of at least about 60%;
      crystallizing the purified solution obtained from the simulated moving bed chromatography from a starting temperature of at least about 20-30° C. and letting the saturated mass crystallize by cooling down to at least 10-20° C. or at least 0-10° C., or from a starting temperature of at least about 30-40° C. and letting the saturated mass crystallize by cooling down to at least about 20-30° C., at least 10-20° C. or at least 0-10° C., or from a starting temperature of at least about 40-50° C. and letting the saturated mass crystallize by cooling down to at least about 30-40° C. to at least about 20-30° C., at least 10-20° C. or at least 0-10° C., or from a starting temperature of at least about 50-60° C. and letting the saturated mass crystallize by cooling down to at least 40-50° C., at least about 30-40° C., at least about 20-30° C., or at least about 10-20° C., or at least about 0-10° C. to obtain a homogeneous crystal mass;

treating the crystal mass with a mixture of an alcohol, solvent, or water-miscible alcohol or solvent and water, wherein the alcohol or solvent content of the solution is between 10 and 90 vol. % to obtain a mixture of the alcohol or solvent-containing solution and the crystal mass; and at least one washing of the alcohol or solvent-containing or sugar-containing fraction of the crystal mass in order to reduce content of lower saccharides from the crystal mass; and subjecting such crystal mass to at least one homogenization, wherein the homogenization step is selected from freeze-drying, spray-drying, roller or drum drying and band drying, thereby providing a homogenized and dried purified LNnT;

wherein the purified preparation contains the LNnT with a purity of ≥80%.

2. The process according to claim 1, wherein the membrane filtration is nanofiltration, using a membrane which has a molecular weight cut-off of between 0.2 and 3.5 kDa.

3. The process according to claim 1, wherein the membrane has a molecular weight cut-off of between 0.2 and 2.0 kDa.

4. The process according to claim 1, wherein the membrane has a molecular weight cut-off of between 0.2 and 1.0 kDa.

5. The process according to claim 1, wherein the filtrated solution obtained from the membrane filtration contains LNnT with a purity of more than 60%, more than 65%, or more than 70%.

6. The process according to claim 1, wherein the simulated moving bed chromatography comprises
   i) at least 4 columns, optionally at least 8 columns, optionally at least 12 columns, wherein at least one column comprises a weak or strong cation exchange resin, optionally a cation exchange resin in the H+-form, Na+-form, K+-form or Ca2+-form; and/or
   ii) four zones I, II, Ill and IV with different flow rates; and/or
   iii) an eluent comprising or consisting of water, optionally ethanol and water, optionally 5-15 vol. % ethanol and 85-95 vol. % water, optionally 9-11 vol. % ethanol and 89-91 vol. % water,
   iv) an operating temperature of 15 to 60° C., optionally 20 to 55° C., optionally 25 to 50° C.

7. The process according to claim 1, wherein the simulated moving bed chromatography comprises
   i) four zones I, II, Ill and IV with different flow rates, wherein the flow rates are optionally 22-32 ml/min in zone 1, 17-23 ml/min in zone II, 18-25 ml/min in zone Ill and/or 14-20 ml/min in zone IV; and/or
   ii) a feed rate of 0.5-4 ml/min, optionally 2 ml/min; and/or
   iii) an eluent flow rate of 6-12 ml/min, optionally 8 ml/min; and/or
   iv) a switching time of 14-20 min, optionally 16-18 min, optionally 17 min, optionally, at least one of the columns comprises 0.1 to 5000 kg of cation exchange resin, optionally 0.2 to 500 kg of cationic exchange resin, optionally 0.5 to 50 kg of cation exchange resin, optionally 1.0 to 20 kg of cation exchange resin.

8. The process according to claim 1, wherein the purified solution obtained from the simulated moving bed chromatography contains LNnT with a purity of more than 75% or more than 80%.

9. The process according to claim 1, wherein the purified solution obtained from at least one simulated moving bed chromatography can be subjected to at least one other further purification using simulating moving bed chromatography, wherein a purified solution comprising LNnT with a purity of >85%, optionally >90%; optionally >93% is provided.

10. The process according to claim 1, wherein the crystallization step comprises
   treating the crystal mass with a mixture of an alcohol, solvent, or water-miscible alcohol or solvent and water, wherein the alcohol or solvent content of the solution is between 30 and 80 vol. % and optionally between 50 and 70 vol. %, to obtain a mixture of the alcohol or solvent-containing solution and the crystal mass.

11. The process according to claim 1, wherein washing of the alcohol or solvent-containing or sugar-containing fraction of the crystal can be repeated at least two times in order to reduce content of lower saccharides.

12. The process according to claim 1, wherein content of lower saccharides is less than 10%, optionally less than 5% and the optionally less than 3%.

13. The process according to claim 1, wherein the crystals obtained from the crystallization step contain LNnT with a purity of more than 85%, more than 90% or more than 95%.

14. The process according to claim 1, wherein the purity of the LNnT in the purified preparation is ≥85% with respect to the dry matter of the purified preparation.

15. The process according to claim 14, wherein the purity of the LNnT in the purified preparation is ≥90% with respect to the dry matter of the purified preparation.

* * * * *